(12) United States Patent  
Chien

(10) Patent No.: US 10,476,286 B2  
(45) Date of Patent: Nov. 12, 2019

(54) DESK TOP ITEM HAS USB-UNITS OR USB-MODULE HAS USB-CHARGING PORTS TO CHARGE ENERGY-STORAGE UNIT OR ASSEMBLY INSIDE OF THE OTHER ELECTRIC OR DIGITAL DATA DEVICE(S)

(71) Applicant: Tseng-Lu Chien, Walnut, CA (US)

(72) Inventor: Tseng-Lu Chien, Walnut, CA (US)

( * ) Notice: Subject to any disclaimer, the term of this patent is extended or adjusted under 35 U.S.C. 154(b) by 698 days.

(21) Appl. No.: 14/827,810

(22) Filed: Aug. 17, 2015

(65) Prior Publication Data  
US 2016/0186973 A1 Jun. 30, 2016

Related U.S. Application Data

(63) Continuation of application No. 14/643,026, filed on Mar. 10, 2015, which is a continuation of application  
(Continued)

(51) Int. Cl.  
*H02J 7/00* (2006.01)  
*F21S 8/00* (2006.01)  
(Continued)

(52) U.S. Cl.  
CPC ............. *H02J 7/0052* (2013.01); *F21S 6/003* (2013.01); *F21S 8/035* (2013.01); *F21V 15/01* (2013.01); *F21V 23/02* (2013.01); *F21V 23/023* (2013.01); *F21V 23/06* (2013.01); *F21V 33/00* (2013.01); *F21V 33/0004* (2013.01); *F21V 33/0024* (2013.01); *F21V 33/0048* (2013.01); *F21V 33/0056* (2013.01); *G02B 6/0045* (2013.01); *G04B 19/30* (2013.01); *G06F 1/266* (2013.01); *G09F 23/00* (2013.01); *H01R 13/6691* (2013.01); *H01R 25/006* (2013.01); *H02G 3/14* (2013.01); *H02J 4/00* (2013.01); *H02J 7/007* (2013.01); *H02J 7/0042* (2013.01); *H02J 7/0047* (2013.01); *F21V 23/0442* (2013.01);  
(Continued)

(58) Field of Classification Search  
CPC ..................................................... H02J 7/0052  
See application file for complete search history.

(56) References Cited

U.S. PATENT DOCUMENTS 6,474,823 B1 11/2002 Agata et al.  
6,666,563 B2 12/2003 Brown  
(Continued)

*Primary Examiner* — Richard V Muralidar  
(74) *Attorney, Agent, or Firm* — Bacon & Thomas, PLLC

(57) ABSTRACT

Desk top items has LED include USB-unit(s) or USB-module(s) has 2007 released specification of quickly USB Charging-port(s) has minimum 1.0 Amp to 5 Amp charging capacity to quickly charge DC current into energy-storage unit or assembly inside the other electric or digital device(s) and, optionally, additional outlet-units, to supply AC current to other electric or digital devices including smart phone, computer, communication, consumer electric products. The USB-unit(s) or USB-Module(s) or Outlet-unit(s) fit within or install on anywhere of the item's housing including anywhere of the base, pole, bar, stand, step, contour, edge, walls. The said USB charger only has charging function no any data transmit and only have one input power source not more than one and charging capacity minimum 1.0 Amp up for quickly charge from USB-Charging-ports by 2 male USB-plugs' USB-wire to the device's female USB-ports.

17 Claims, 11 Drawing Sheets

Related U.S. Application Data

No. 14/144,703, filed on Dec. 31, 2013, which is a continuation of application No. 13/161,643, filed on Jun. 16, 2011, now Pat. No. 8,783,936.

(51) Int. Cl.

| | | |
|---|---|---|
| *F21V 8/00* | (2006.01) | |
| *G09F 23/00* | (2006.01) | |
| *H01R 13/66* | (2006.01) | |
| *H01R 25/00* | (2006.01) | |
| *H02G 3/14* | (2006.01) | |
| *F21V 23/02* | (2006.01) | |
| *F21V 33/00* | (2006.01) | |
| *F21V 15/01* | (2006.01) | |
| *G04B 19/30* | (2006.01) | |
| *H02J 4/00* | (2006.01) | |
| *G06F 1/26* | (2006.01) | |
| *F21S 6/00* | (2006.01) | |
| *F21V 23/06* | (2006.01) | |
| *F21V 23/04* | (2006.01) | |
| *F21W 121/00* | (2006.01) | |
| *H01H 9/18* | (2006.01) | |
| *H01R 13/713* | (2006.01) | |
| *H01R 24/76* | (2011.01) | |
| *H01R 103/00* | (2006.01) | |
| *F21Y 115/10* | (2016.01) | |

(52) U.S. Cl.
CPC ........ *F21V 33/006* (2013.01); *F21W 2121/00* (2013.01); *F21Y 2115/10* (2016.08); *G02B 6/0021* (2013.01); *H01H 2009/186* (2013.01); *H01R 13/713* (2013.01); *H01R 24/76* (2013.01); *H01R 2103/00* (2013.01); *H02J 2007/0059* (2013.01); *H02J 2007/0062* (2013.01); *Y10T 307/406* (2015.04)

(56) References Cited

U.S. PATENT DOCUMENTS

| | | |
|---|---|---|
| 7,736,033 B2 | 6/2010 | Patel |
| 7,897,277 B2 | 3/2011 | Meyer et al. |
| 8,545,039 B2 * | 10/2013 | Patel ................ F21S 6/002 307/43 |
| 2009/0154148 A1 * | 6/2009 | Meyer ................ F21L 2/00 362/157 |
| 2011/0084660 A1 * | 4/2011 | McSweyn ......... H01R 13/6675 320/111 |
| 2014/0218927 A1 | 8/2014 | Chien |
| 2015/0070896 A1 | 3/2015 | Chien |
| 2015/0082057 A1 | 3/2015 | Chien |
| 2015/0176826 A1 | 6/2015 | Chien |

* cited by examiner

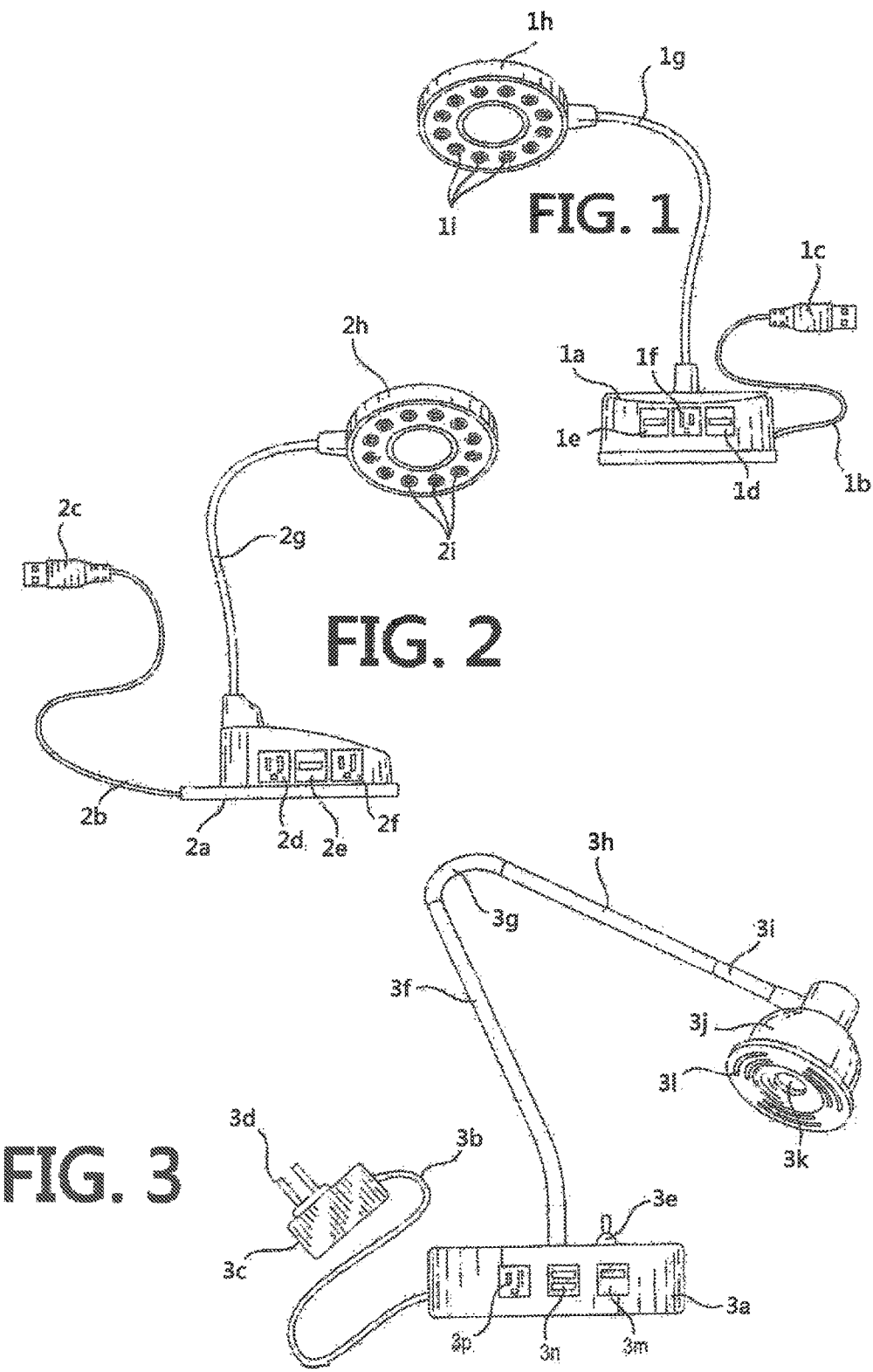

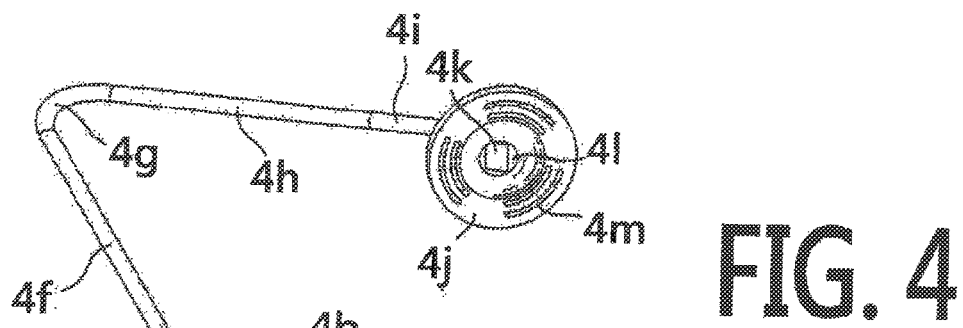
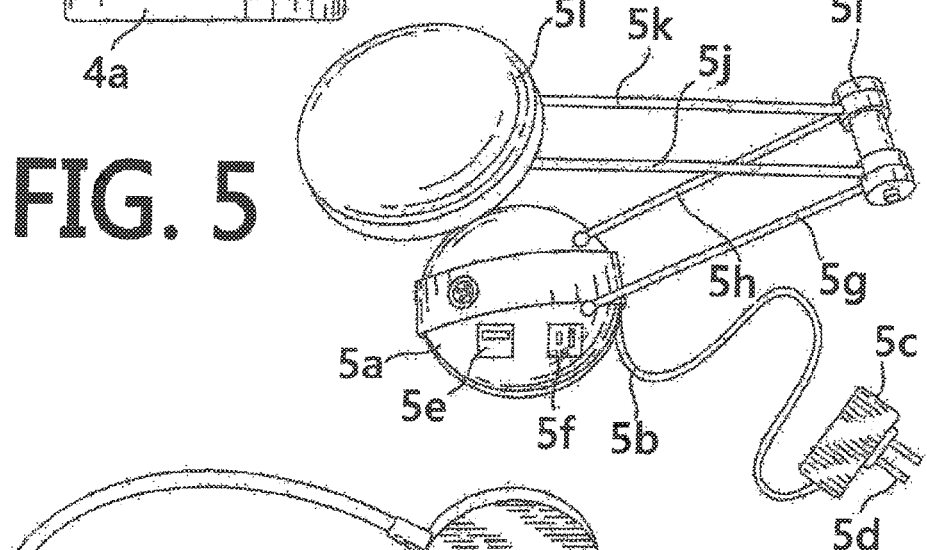
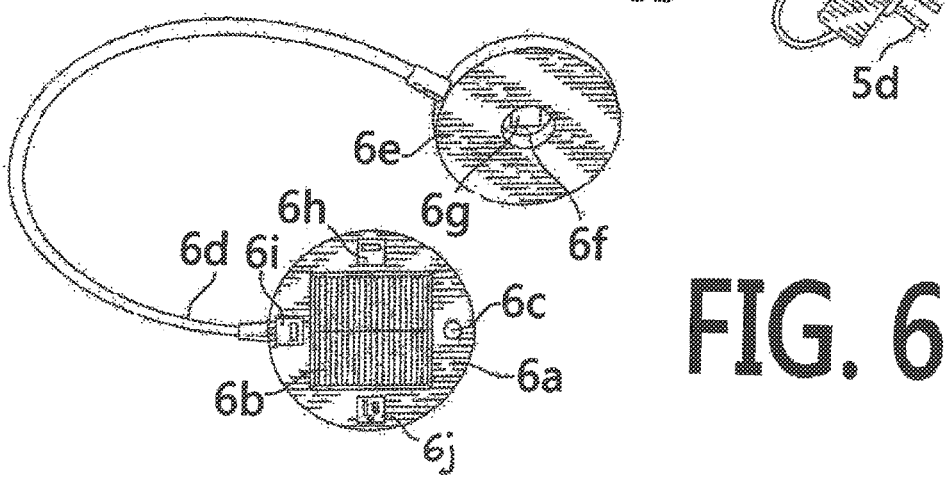

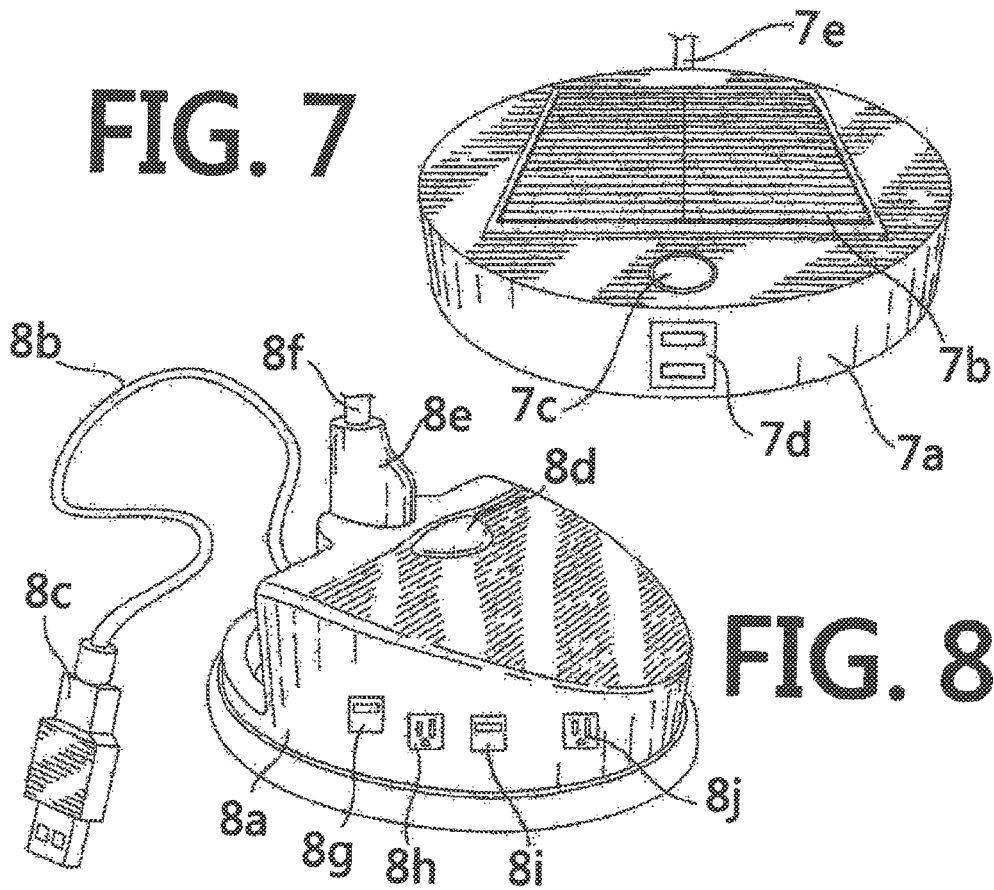
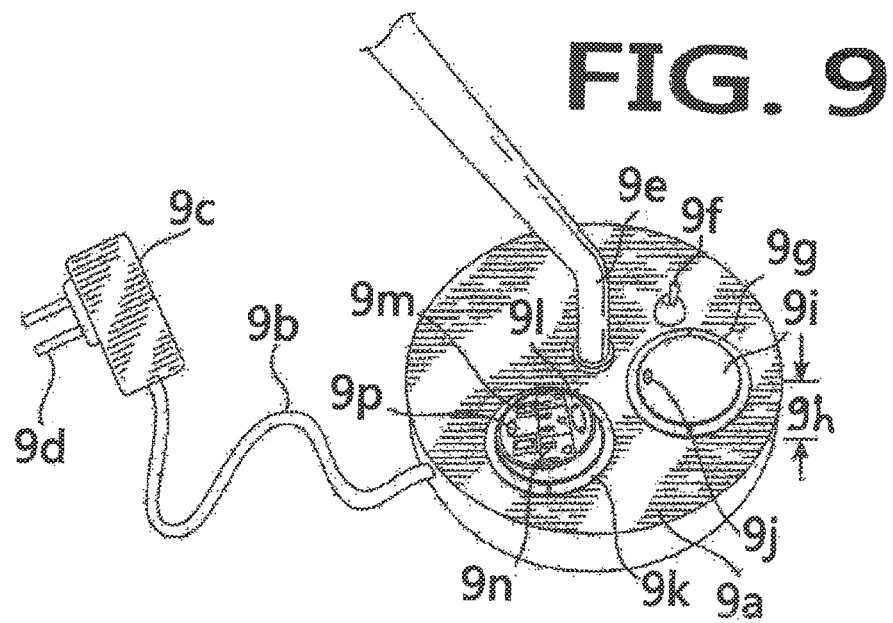

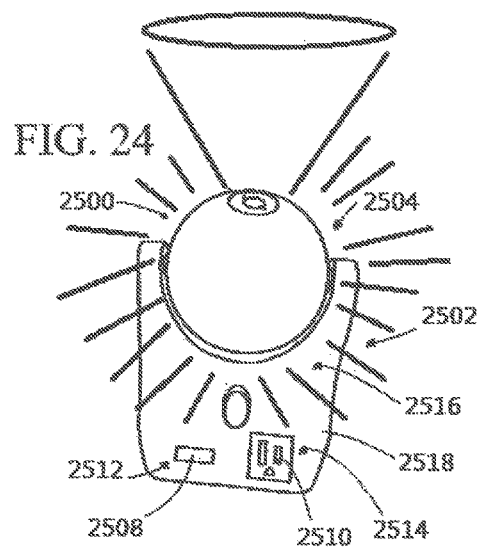
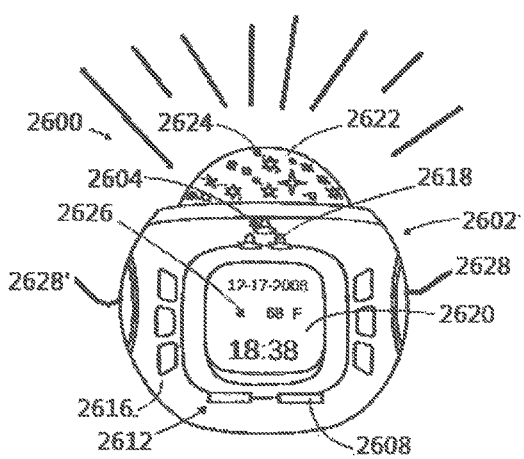
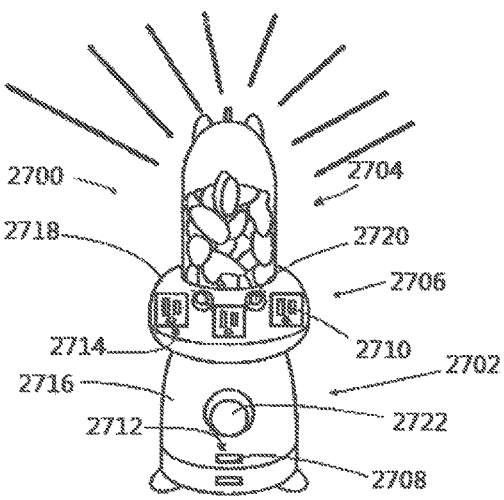
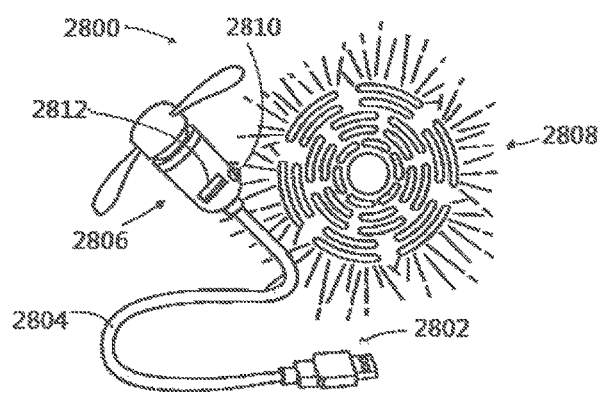

DESK TOP ITEM HAS USB-UNITS OR USB-MODULE HAS USB-CHARGING PORTS TO CHARGE ENERGY-STORAGE UNIT OR ASSEMBLY INSIDE OF THE OTHER ELECTRIC OR DIGITAL DATA DEVICE(S)

BACKGROUND OF THE INVENTION

This application has subject matter in common with the inventor's U.S. patent application Ser. No. 13/117,227, filed May 27, 2011, now U.S. Pat. No. 8,783,036, entitled "Universal module of USB-unit or Outlet-units for electric or digital data device(s)."

This application also has subject matter in common with the inventor's U.S. patent application Ser. Nos. 12/502,661, 12/292,580, 12/566,322, 11/498,874, 11/527,629, 12/622,000, and 12/624,621, which disclose a sealed-unit with uniform dimensions and shape to fit into the same uniformly dimensioned compartment so that the universal sealed-unit can fit into a variety of LED light devices. The sealed unit(s) disclosed in these applications share the following features:

The sealed-unit(s) has uniform dimensions to fit into the uniform compartment of any kind of LED light device.

The sealed-unit(s) has passed all related safety standards and received a laboratory's safety certification so that it can be used with other LED light device's parts and accessories which may or may not meet the safety standard passed by the sealed-unit(s).

The sealed-unit(s) can be any individually salable unit because it has passed all related safety requirements and standards. The other parts or accessories may or may not be just decorative or have other functions to make the LED light device more valuable.

The current invention utilizes the sealed-unit concept in the following manner:

(1) The current invention utilizes the concept disclosed in the above-cited applications of providing a sealed-unit that has passed all the relevant safety standards, but applies the concept to other electric device(s) which are not limited to an LED light device. The concept may be applied to an LED light device, power strip device, wall outlet device, surge protection device, wall adaptor device, charging device(s), smart phone related device(s), computer related device(s), and other consumer electric device(s).

(2) The USB-unit or outlet-unit may be in the form sealed-unit of a rather than the previously disclosed LED-Unit, battery-pack, or prong and the said Sealed unit may just (2a) a charging circuit board assembly for USB-unit to charge (not supply) the energy storage unit which built-inside of the said other device only, (2b) maybe is a conductive-piece assembly for Outlet-unit to deliver or supply the input AC current to the other device (2c) USB-unit maybe just a USB-receiving device to get power from the outside transformer, adaptor, invertor which already change outlet's AC current to DC current so can just pass though the said USB-Unit to charge (Not supply) the current to the said energy storage unit inside the said other electric or digital device.

(3) The USB-unit or outlet-unit are arranged to charge or supply power from these units to a variety of electric devices to keep the electric device(s) in good power condition for people to use but USB-Unit is to charge the energy-storage unit and preferred is rechargeable battery and not directly supply power to the said electric device such as said mobile phone. The Outlet-unit which simple just is conductive-piece assembly to deliver the AC current to the said other device power input end such as prongs directly and optional has surge protection or wireless controller.

(4) The USB-unit or outlet-unit may each include its own related circuit, conductive piece, contact-piece, custom-pins, receiving-ends, output-ends, input-ends, electric parts and accessories to get the electric power from (4-a) AC power by a prong-cable from outlets; or (4-b) DC power from USB-cable to get power from outside power bank/energy storage unit or assembly which has multiple Amperage current storage capacity not from the computer export-ends which only limited 500 ma too slow for charging; or (4-c) DC power from outside housing transformer, adaptor, invertor unit which already has circuit built-in and already change the AC current to DC current, and though a receiving-wire or delivery-wire or USB-wire has at least 2 male USB-plugs to insert into above USB-Unit or USB-Module female receiving-port (USB Charging-ports) for supplying DC power to a variety of electric device's female receiving-port which has desire contact or connector or Custom-Pin ports for the other device USB receiving port which depend on the other device's design so it is variable. The USB Charging-ports prefer to use Type A which is most common for the desktop items so can fit for all kind of the USB-wires at least one-plug of the said 2 plugs on each USB-Wire or jump wire or bridge wire at this time. On later time maybe will prefer to use Type C because more compact and majority of the other electric device will has this type of Type C USB-unit from now device so can make the other device has smaller new Type C USB-unit to make the overall size become more compact and thin. Anyway, the one end of the USB-wire can be any type such as Type C or any kind of Custom-Pin contact depend on market design and requirement.

The said USB port type may in Type A, Type B, Type C each of these has Female receiving-end and male plug so can build the electric power delivery. It also has digital data delivery but at this invention do not use and do not need to use the electric data or digital data delivery functions and the current invention only for Charging purpose only so can prevent slow charging or overheat issue happened.

The desktop items USB port (USB Charging-pots) cannot use special of custom-pin to fit the other electric device's USB receiving-pots because this will become only can charge one of other electric or digital device. The current invention's USB charging-port preferred to use Type A which is most popular same as all laptop computer USB receiving ports because this can easily built-in on the Desktop items which is no need to have super compact size like the be charged items such as mobile phone, iPad which need as slim as possible so these communication or consumer electric products need use special custom-pin such as mini USB, Micro USB, or even type C for the USB receiving port so can allow the mail-plug of mini USB or micro USB can insert into so can make the communication or hand-held iPad as slim and thin as possible. For Desk top still use the Type A will be more popular and can fit almost every USB-wire, jump-wire, bridge wire so can charge any kind of other electric or digital device. As for special USB Charging-pots allow to charge minimum 1.0 Amp to 5 Amp specification release on 2007 and update on 2010 which is for quickly charging capacity this is what the current invention specify for charging capacity minimum from 1.0 Amp and has details discuss on hereafter.

(5) The current invention offers USB-unit or Outlet-unit is a universal module design with the most compact size to enable each of the USB-unit and outlet-unit or any combination of USB-units and/or outlet-units to form a desired module that fits into all kinds of electric device(s), including an LED light device, wall outlet, wall outlet adaptor, power strips, surge protector, communication device, computer device, consumer electric device, smart phone device, panel computer device, etc. The universal module design means can fit into more than one of the other device and no need to change its electric circuit, PCB, trace with current invention use quickly charging USB Charging-ports has 2007 & 2010 definition and has minimum 1.0 Amp up charging capacity.

(6) Once the USB-unit or outlet-unit in circuit board assembly, in sealed unit assembly, in a universal module assembly and has passed all related safety standards and has its own issued certification, the finished electric device in which it is used does not need to get an additional safety certification related to USB-units or outlet-units. This means can save a lot of time and resource to apply each finish product's USB-unit or Outlet-unit meet the local safety standard and no fire, no electric shock, no electric shortage hazard. Plus the current invention use the quickly charging USB Charging-ports which has 2007 & 2010 definition and has minimum 1.0 Amp up charging capacity.

(7) The modules of the current invention can utilize any combination of suitable USB-unit or outlet-unit parts, such as a conductive wire, conductive plate, conductive piece, contact-kit, prong-cable kits, USB-cable, prongs, resilient conductive kit, printed circuit, flexible circuit board, related electric parts and accessories, fixing, positioning kit, and/or installation device to enable the module, outlet-unit, or USB-unit to pass the safety standard and get the relevant safety certification and be added onto more than one or a lot of others electric device.

(8) The module of the current invention may have different specifications, such as:
1 module has 1 USB-unit+1 USB-port,
module has 2 USB-ports+1 outlet-unit,
1 module has 2 USB-ports+2 outlet-units,
1 module=only has 1 USB-unit, or 1 Outlet
or, any combination of USB-units and outlet-units that still permits a standard module to fit into many of different electric device(s) as needed with current invention has quickly charging USB Charging-ports which has 2007 & 2010 definition and has minimum 1.0 Amp up charging capacity.

(9) The module can also have the following different specifications: 2 USB ports having different current outputs including, 1 Amp, 1.1 Amp, and/or 2.2 Amps to enable the 2 USB-ports to charge different electric devices such as an iPhone™, which needs to have 1 Amp, and an iPad™, which requires 2.1 Amps.

If people want to charge 1 iPhone™+1 iPad™ at the same time, at least 3.1 Amps will be needed, which will be very expensive. Or more high speed charge for 4.2 Amp for 2 pcs of 2.1 Amp, or more higher speed charge for 4.8 Amp for 2 pcs of 2.4 Amp. from data the current invention preferred for USB Charging-port basing on 2007 released for USB2.0 standard and 2010 upgrade for charging-port. However, as the current invention all desktop has no any digital data delivery and only charging function, so the current invention can have bigger current charging than out of date (Before 2007) for limited 500 ma or less charging with overheat issues as the wiki reported on below text for cross reference!

If people want to charge the 1 iPhone™ or 1 iPad™ at different times, the standard module can be 1 port 1 Amp+1 port 1.1 Amp=2.1 Amps total, and the cost will be cheaper.

If people want to charge only 1 iPhone™, only need 1 USB-unit with 1 port which has only 1 Amp is needed for the most economical product. Hence, the module of the invention should not be limited to only one specification. But the current invention has quickly charging USB Charging-ports application which meet 2007 & 2010 released definition and has minimum 1.0 Amp up charging capacity.

The current invention specify the Charging capability start from 1.0 Amp up to hundreds of Amp and the old date before 2007 has limited for 500 ma charging capacity for out of date USB construction and also has overheat or burn problem for bigger than 500 ma so from 2007 has update USB charging port so market can has a lot of USB-charging device coming from 2010 for Big charging current such as the current invention. The below is copy from Wikipedia, The Free Encyclopedia has the details (Charging port and Charging speed and Charging port) to support the current invention for update charging capability.

USB

From Wikipedia, the free encyclopedia

USB 2.0

*Battery Charging Specification* 1.1: Released in March 2007 and updated on 15 April 2009. Adds support for dedicated chargers (power supplies with USB connectors), host chargers (USB hosts that can act as chargers) and the No Dead Battery provision, which allows devices to temporarily draw 100 mA current after they have been attached. If a USB device is connected to dedicated charger, maximum current drawn by the device may be as high as 1.8 A. (Note that this document is not distributed with USB 2.0 specification package, only USB 3.0 and USB On-The-Go.)

*Battery Charging Specification* 1.2:[25] Released in December 2010. Several changes and increasing limits including allowing 1.5 A on charging ports for unconfigured devices, allowing High Speed communication while having a current up to 1.5 A and allowing a maximum current of 5 A.

USB 3.0[Edit]

Main Article: USB 3.0

As with previous USB versions, USB 3.0 ports come in low-power and high-power variants, providing 150 mA and 900 mA respectively, while simultaneously transmitting data at SuperSpeed rates.[28] Additionally, there is a Battery Charging Specification (Version 1.2—December 2010), which increases the power handling capability to 1.5 A but does not allow concurrent data transmission.[25] The Battery Charging Specification requires that the physical ports themselves be capable of handling 5 A of current[citation needed] but limits the maximum current drawn to 1.5 A.

*The USB Battery Charging Specification Revision* 1.1 (released in 2007) defines a new type of USB port, called the charging port. Contrary to the standard downstream port, for which current draw by a connected portable device can exceed 100 mA only after digital negotiation with the host or hub, a charging port can supply currents between 500 mA and 1.5 A without the digital negotiation. A charging port supplies up to 500 mA at 5 V, up to the rated current at 3.6 V or more, and drops its output voltage if the portable device attempts to draw more than the rated current. The charger port may shut down if the load is too high.[92]

Two types of charging port exist: the charging downstream port (CDP), supporting data transfers as well, and the dedicated charging port (DCP), without data support. A portable device can recognize the type of USB port; on a dedicated charging port, the D+ and D− pins are shorted with a resistance not exceeding 200 ohms, while charging downstream ports provide additional detection logic so their presence can be determined by attached devices.[92]

With charging downstream ports, current passing through the thin ground wire may interfere with high-speed data signals; therefore, current draw may not exceed 900 mA during high-speed data transfer. A dedicated charge port may have a rated current between 500 and 1,500 mA. For all charging ports, there is maximum current of 5 A, as long as the connector can handle the current (standard USB 2.0 A-connectors are rated at 1.5 A).[92]

Before the battery charging specification was defined, there was no standardized way for the portable device to inquire how much current was available. For example, Apple's iPod and iPhone chargers indicate the available current by voltages on the D– and D+ lines. When D+=D–=2.0 V, the device may pull up to 500 mA. When D+=2.0 V and D–=2.8 V, the device may pull up to 1 A of current.[93] When D+=2.8 V and D–=2.0 V, the device may pull up to 2 A of current.[94]

Dedicated charging ports can be found on USB power adapters that convert utility power or another power source (e.g. a car's electrical system) to run attached devices and battery packs. On a host (such as a laptop computer) with both standard and charging USB ports, the charging ports should be labeled as such.[92]

To support simultaneous charge and data communication, even if the communication port does not support charging a demanding device, so-called accessory charging adapters (ACA) are introduced. By using an accessory charging adapter, a device providing a single USB port can be attached to both a charger, and another USB device at the same time.[92]

The *USB Battery Charging Specification Revision* 1.2 (released in 2010) makes clear that there are safety limits to the rated current at 5 A coming from USB 2.0. On the other hand, several changes are made and limits are increasing including allowing 1.5 A on charging downstream ports for unconfigured devices, allowing high speed communication while having a current up to 1.5 A, and allowing a maximum current of 5 A. Also, revision 1.2 removes support for USB ports type detection via resistive detection mechanisms

(10) If the (10-1) module, or (10-2) a sealed-unit or (10-3) USB-Unit, or (10-4) USB-unit in a circuit board form, or (10-5) Outlet-unit, or (10-6) Outlet-unit is a conductive-piece assembly has its own issued safety certification and that can fit into the any compartment of any other electric device, there is no need to file, for each different electric devices, a UL, ETL, or CSA safety certification, which saves a lot of time for tooling, development, and safety testing for each different electric device. This will reduce a lot of R&D, development, tooling, safety certification time and fees.

However, Some cases, it no need get pre-certification for the all (10-1) to (10-6) because factory may only make 1 model of the products or other reason for limited products productions, so no need get pre-certification is also fall within the current invention has built-in USB related parts & accessories to Charging the DC current into the built-in energy storage unit of other device or Deliver the AC power though conductive assembly to the other device. To get pre-certification good only for factory has a lot of desktop items so need to do pre-certification to save each time test the USB-Charger or Outlet-unit or the items listed on above (10-1) to (10-6).

The co-pending application entitled "Universal module of USB-unit or Outlet-unit for electric or digital data device," U.S. Ser. No. 13/117,227, (#FFF-11) discloses a simple arrangement for enabling "Desk Top items with LED means having USB-unit(s) or USB-module(s) to charge a variety of electric or digital data device(s)," which does not require a universal module because some of the desk top items have plenty of room/space to accommodate a larger size of USB-unit(s) or USB-module(s) or above discussed (10-1) to (10-6) and reduce the cost for related electric components, parts, or accessories to make the items more cost attractive to the consumer.

The USB-unit(s) and all above discussed (10-1) to (10-4) is an electric USB-charging unit which has a USB-female receiving means (hereafter as USB-Charging port as wiki release on 2007 has minimum 1.0 Amp charging capability) to receive a wire's USB-male plug (hereafter as USB-plug) to deliver electric power from the USB-female receiving means (USB-Charging port release on 2007 as wiki disclosure) to the other wire device's USB-male plug (USB-Plug).

The preferred USB-female receiving means (USB Charging-Ports) gets power from a power source and uses circuit to convert the in-put AC electric power to an out-put power has desired waveform, voltage, and current flow or amperage (A or ma) by circuit which may (AA-1) circuit install inside the desk top housing has at least one of transformer, adaptor, invertor, converter to change AC current to DC current.

(AA-1) circuit install within outside housing's and has at least one of transformer or adaptor or invertor or converter to change AC current to DC current to enable the wire device 1st USB-male plug (USB-Plug) to supply power from wire's $1^{st}$ input-end USB-plug to $2^{nd}$ wire-output end's USB-plug which has desire connector type selected from (T-1) Type A, (T-2) Type B, (T-3) Type C or (T-4) mini-USB, (T-5) micro-USB or (T-6) custom-pin USB while the $2^{nd}$ end's USB-Plug of USB-Wire to insert into the USB-receiving port of the other electric or digital device(s). The current invention all the related USB Charging-Port has min. 1.0 Amp up to 5 Amp and meet the USB 2.0 and USB 3.0 and has NO electric data or digital data delivery functions as co-inventor's plurality issued and co-pending filing case including parent filing case U.S. Pat. No. 8,783,936 filed on Jun. 16, 2011 and issued on Jul. 22, 2014 of inventor's reference series number (#GGG-2011), and child-Filed U.S. Pat. No. 8,911,137 (#GGG-2), U.S. Pat. No. 8,915,608 (#GGG-1), U.S. Pat. No. 8,931,947 (#GGG-4) and co-pending filing cases. Also, all the current invention only accept ONLY ONE input current not allow more than one input current such as normal time is AC power and change to DC power while power fail which will had a lot of controller or additional circuit need to do which may have more risk for fire case happened.

The USB-module(s) described in the co-pending application is an electric charging module which has at least one (aa) USB-female Charging receiving means (USB Charging-Port as wiki release on 2007) but also has a number of receiving means selected from (bb) an outlet-female receiving means (hereafter as Outlet-ports), (cc) USB-female Charging receiving means (hereafter as be charged device's USB Ports), (dd) USB-female Hub receiving means for digital or electric data delivery (hereafter as USB-HUB Ports)

(ee) an adaptor's female receiving means (hereafter as Adaptor-ports), or (ff) any conventional female receiving means (hereafter as Any-Other-ports)

to form a single body which has more than one (aa) USB-female Charging receiving means (USB Charging-port) to offer the same or different electric power though the different female receiving means (hereafter as different ports) within the one body.

The USB-module connects with an input power source and circuit to offer a desired waveform, voltage, and current (Amperage or mini-amperage) as output power to charge energy-storage unit or assembly inside of the said other device(s) when the female receiving means (USB ports) is connected with other device's the male plug (USB-Plug) of desire style of the connect, style, size, construction or custom-pin for connection for be charged device(s).

Hereof, Also attached the USB history charter for different years for the USB generation;

| Version history[edit] | | | |
|---|---|---|---|
| Version history overview[edit] | | | |
| Release name | Release date | Speed and max signalling rate | Note |
| USB 0.8 | December 1994 | | |
| USB 0.9 | April 1995 | | |
| USB 0.99 | August 1995 | | |
| USB 1.0 Release Candidate | November 1995 | | |
| USB 1.0 | January 1996 | Low Speed (1.5 Mbit/s), Full Speed (12 Mbit/s) | |
| USB 1.1 | August 1998 | | |
| USB 2.0 | April 2000 | High Speed (480 Mbit/s) | |
| USB 3.0 | November 2008 | SuperSpeed (5 Gbit/s) | Also called USB 3.1 Gen 1[19] |
| USB 3.1 | July 2013 | SuperSpeed+ (10 Gbit/s)[20] | Also called USB 3.1 Gen 2[21] |

So, the current invention offer a quickly USB charging-port to offer the min. 1.0 Amp and the current invention only for Charring function from the charging circuit connected with power source from (4-a) AC power by a prong-cable from the AC outlets from wall or extension cord, power strips and has circuit inside of Desktop item's housing has at least one of transformer, adaptor, invertor unit to change AC current to DC current or (4-b) DC power from USB-cable to get power from outside housing's power bank or/energy storage unit directly do not have other circuit or controller which has multiple amperage current storage so can offer minimum charging capacity from 1.0 A up to 5 Amp range or higher, or (4-c) DC power from circuit inside of outside housing has at least one of transformer, adaptor, invertor unit which already change the AC current to DC current, And though a receiving-wire or delivery-wire has at least 2 male USB-plugs to insert into above USB-Unit or Outlet-unit female receiving USB charging-port for supplying power to a variety of electric device's female receiving-port to charge the inside energy-storage unit or assembly DC current so can make other electric or digital device can work or operation.

To enable people to easily reach, touch, operate, or manage the desk top items, the USB-unit(s) or USB-module(s) are installed on or within the item/housing or a substrate(s). The items may be positioned at a location where people will stay for a period of time, such as a desk, table, bed, chair, land, grass, or wherever else people work, rest, or take a nap. For example, people use a computer, laptop computer, iPhone™, iPad™, or iCloud™ on a substrate(s), location, or place such as a table, desk, bed, laptop stand, laptop supporter, laptop cushion or any similar surface(s) which allows people to work, sleep, or lay down for a period of time while charging other electric or digital data device(s).

In all such places where people will stay for period of time, the nearby desk top items have built-in USB-units to easily offer electric power to all other electric or digital data device(s), so people do not need to bend their body to find a power source under the table, which normally is farther away than the desk top items having LED means. Hence, this arrangement offers good convenience for people while they work, rest, or even take a nap, so that they can easily use the USB-unit(s) or USB-module of the desk top items to charge their small phone, computer, iPad™, or any other electric or digital data device(s) while they work, rest, sleep or take a nap.

It is desirable for the universal module of the USB-unit(s) or outlet-unit(s) described in the co-pending application to be made as small as possible so that it can fit into as many applications' limited housing size as possible and therefore really meet the goal of universal applicability. On the other hand, the smallest, slimmest, or most compact size of the USB-unit(s), outlet-unit(s), or USB-module is too expensive. For example, the APPLE™ iPhone™'s or iPad™'s USB-unit, which is very small in size, needs to use a very high cost compact transformer or inverter with super big power output in order to achieve a very short time to fully charge the other electric or digital data device(s). This problem can be resolved if, in order to get the USB-3.0 standard 2.1 amp output from the USB-unit(s), the size of some electric components, parts, or accessories such as transformer or inverter, or other same-function electric parts, or accessories can be increased by placing it in a desk top item with sufficient space, thereby obtaining the same big power output at a substantially lower cost to let the consumer save pocket money. Suitable desk top items to which a universal module, USB-unit, or outlet-unit can be added include a desk lamp, desk top clock, desk top radio, desk top fan, desk top lighting, reading light, wall reading light, head lighting, book light, electric picture display, night light with AC to DC power source or adaptor with prong and wire means, projection light with AC to DC power source or adaptors with prong and wire means, electric candle set with AC to DC power source or adaptors with prong and wire means, or any LED device that can serve as a desk top item as described herein and that can accommodate a USB-unit or USB-ports designed only for charging purposes rather than delivery of digital data. The desk top items can provide function(s), performance, and effects(s) including, by way of example, generation of light beams and projection of images such as time images, as well as serving as a source of illumination, music, power, electric signals, photos, and digital signals for sound, light, music, smell or any conventional market-available devices that people will keep on for a period of time sufficient to also enable charging of other electric or digital data device(s).

The current invention are different with the US prior art including:

1. U.S. Pat. Nos. 7,736,033 and 8,545,039 Patel. The Lamp Base with Electric device recharge receptacle & means. The Bhart's disclosure the Outlets device and the Cigar lighter build on the lamp base. The Lamp Base make the input AC current transfer to output current to automobile current (12 Volt), then the Automobile Cigarette make the input current from (12 VDC) to USB end current (5 Volt). This means the Bhart's device at least need 2 expensive circuit/Transformer to get the USB Charger's output current from (120 VAC wall outlets) to (USB Current 5 VDC). This is not economical and none of people need 12 Volt DC for house use at all.

The current invention direct install the USB Charger unit which transfer the input-end 120 VAC to output-end 5 VDC so this is practically.

2. US Prior Public 2011-017703 Rotatable & concealable device which only has the outlets device with manual switch. This is directly for 120 VAC outlets power source directly though metal piece and delivery 120 VAC to the rotatable & concealable device's receptacles to offer 120 VAC current while the other device's plug means connect with the said receptacle.

'703 patent fail to disclose the any USB charger concept, circuit, design and application so not have any related with the current invention for USB charger and the current invention device use Overlay to sit on existing lamp base to offer multiple power type power station with a lot of features.

3. US prior art: U.S. Pat. No. 7,897,277 Meyer et al, disclosure the Reversible battery cartridge which are use the AC batteries cartridge as the backup power for the all kind of lamp which mainly for power fail application. This is nothing to do with USB ports and USB charger application. So there is totally different with current invention related to (1) USB ports+(2) USB Charging+(3) Outlet supply power source+(4) LED light and Universal lamp base to fit for all kind of existing lamp base so not occupy any new desk top space because (5) the Universal Desk base is overlay top of the existing lamp base.

Furthermore, the current invention has (6) LED light incorporate with the above listed (1) (2) (3) (4) (5) so it become a unique practical Universal Power station because (7) the current invention is not only supply one kind of power to charger different electric or digital-data device(s).

4. US prior art—U.S. Pat. No. 6,474,823 Disclosure the laptop computer with top illumination light which is not for the AC power source into USB related circuit to transfer to the DC current to charge DC 5 Volt electric device. The Computer input-end current is 120 VAC but it pass though the computer its transformer already transfer to output-end current at 5 VDC and then there is no any USB Charger circuit inside the computer so the computer's external transformer which directly to delivery 5 VDC current to the to the USB Port so the computer system which is not same as current inventions the input-end current is 120 VAC though USB Charger inside circuit to get the output-end for 5 VDC.

The total circuit and concept is different because computer prior art use the EXTERNAL Transformer which not belong to computer itself parts to transfer the 120V Outlet power. Though EXTERNAL transformer get 5 VDC current (Outside the computer). The Computer itself input-end current is 5 VDC and output-end current of USB ports also is 5 VDC so it proof, Computer itself is no any USB Charger circuit inside.

5. US Prior art: U.S. Pat. No. 8,562,187 Smed disclosure FIG. 2 function for outlet-module has the PCBA to transfer the input AC current to 15 Volt 2 A to turn on the said LED or to change the input AC current to US power outlet or Other country outlet. This is different with the current invention for AC outlet-unit which is directly to deliver the AC current from input-end directly to the AC current output-end. Also, The Smed other output for 15 Volt DC which is not same as the current invention for DC5V with market available USB-port type to connect with all communication, computer, mobile phone wire's specifications so it is not replaceable. The SMED teach use power cord 36 has connector 7 to outlet connector 5. These is totally different for current invention's outlet-unit which no need any power cord 36 to build the electric delivery from desk top lighting device to the other electric device. The current invention outlet-unit has all outlet-receiving ends and can directly plug-into the other electric device male-prong to get electricity.

6. US Prior art: U.S. Pat. No. 8,758,031 Cheng et. Teaches the inside wall USB charger device which is not same as the current invention. Also Cheng's filed date is Jul. 23, 2012 which is too late than current inventions.

7. US prior art: U.S. Pat. Nos. 7,742,293, 8,116,007, 8,432,667 Strauser teach the music player has pedestal support or foot to put ground The exemplary audio device (system) 10 has a system console 24 supported by a pedestal 20. The system console 24 typically has controls (e.g. volume, play, stop, etc), displays and indicators. In this exemplary system 10, music or karaoke content comes from a digital music player 80 that is inserted into a cradle 81 (see FIG. 8) and connected to audio inputs 99 of the exemplary system 10. Even Strauser had teach the USB plug to powered the music-player as below content; In a preferred embodiment, the cradle 81 is stepped as disclosed in the parent application, "DIGITAL MUSIC PLAYER CRADLE ATTACHMENT," Which is included by reference. Thereby, the cradle 81 supports a large variety of music players 80 of varying sizes and shapes. In such, the music player 80 sits in a cradle 81. Power is provided from a power port (e.g. USB port) 21, into Which the power cable plug 82 (e. g. USB plug) is connected to provide power to the music player 80. But it is different with current invention for (1) not desktop items because pedestal 20 for ground installation (2) not people hand reachable distance to charge the other electric device furthermore need to walk to far distance which more trouble than bend body to get power from power strips or outlets (3) No any light source to offer indicator light or any illumination (4) the music player(80) do not supply the power to other device which is different with current invention is music device has built-in circuit and transfer input current to DC 5 Volt to charge the other electric device. So this is not same as current invention for desktop definition and people will stay for a while to charge the other device.

8. U.S. Pat. No. 8,899,797 which for has USB port install on the movable (Movable parts & accessories or Organizer, Or Addable parts & Accessories).

(may add the USB-unit or USB-Module or Outlet-unit or Outlet-Module on the MOVEABLE or ADDED parts of Desk lamp, so we need to add the The '797 who is filed on Aug. 26, 2012 after Co-inventor's U.S. Pat. No. 8,783,936 (# GGG-2011) Public on Dec. 15, 2011. and '797 patent has one prior filed and abandonment as below because it adaptor the phone's custom-pin plug to connect with phone female custom-pin end to build the electric and audio signal delivery, so this is not like the current invention has all USB-port which is female USB receiving ends on the desktop item and though the male-plug kits to of USB wire which has male-plug ends on 2 ends and one end connect with Desktop female USB port and other male plug end inert into the be-Charged device.

Hereof, The comparison for the 2006-020-9530 as below:
1. '9530☐ has bulb-socket so it is not the Built-in LED lamp. This maximum can add LED bulb Lamp device.
    Fact☐ Column (0005) Line 10
        A terminal housing is fixedly disposed relative to the neck second portion, a bulb socket including a seat portion is attached to the terminal housing, and a shell portion of the terminal housing is shaped to receive the base of a light bulb.

2. '9530☐ The Transformer and Bulb-socket in parallel connection. So the light source is get 120 Volt current which is not built-in LED lamp device Fact☐ Column (0006) The lamp support may also house a transformer electrically coupled to the power cord in parallel to the bulb socket.

3. '9530☐ The $2^{nd}$ socket on the edge of the support or base is Custom Pin-Out, Not regular USB-Port so only can charge 1 model of phone as Contact (44) both all for Customer Pin-Out design. This is limited for one and ONLY ONE item can be charged !!

FACT☐[0007] Alternatively, the lamp may include a second socket disposed on the support, the socket having a first end directed internally of the support and coupled to the speaker and a second end positioned externally on the support for connecting to a media device compatible cable.

4. '9530☐ No any wire from charging contact (44) or Outside socket (50) needed while charging the phone. Because the contact (44) or Outside Socket (50) both is custom pin-out construction and the phone just directly plug into this Custom Pin-Out can directly charger. . . . This is only limited one and ONLY ONE phone can be charged. Not like Ivan's use common USB-Female-receiving end and Charging wire's USB insert male-plug to deliver the current and the though charging wire's other ends to connect with the electric or digital device.

The Audio Outpost cable (17) though Round Plug (17a) to transmit the data to speaker (15) (15a), Audit Output cable (17) one end to Music media device (100) and other end to Speaker (15a) (15b)

FACT[0019] As illustrated in FIGS. 1 and 2, an audio output cable 17 is electrically connected via a plug 17l1 at one end to each of speakers 15a and 15b. As illustrated in FIGS. 2 and 4, the other end of audio cable 17 may be fed through an 19 in support 12 and be operable to connect, for example, to the headset jack or other audio output terminal of media player 100 as indicated. Alternatively, as illustrated in FIGS. 1 and 3, the orifice 19 may house a connector (not shown) for plugably connecting to a plug 17b of output cable 17

5. '9530 do not has built-in LED light source, only can install the LED bulb at the bulb-base. Not like the co-inventor's (3) issued patents or co-pending case has LED built-in as light source, No Bulb-Base at all.

FACT (0021) line 10 The light source 24 (e.g. incandescent bulb, halogen lamp, fluorescent bulb, or one or more LEDs) is mounted in the bulb socket 20 and positioned in a plurality of positions relative to the support 12 by arrangement of the Flexible neck 14.

6. '9530 The contact (44) is Custom Pin-Out type which only can charge one and ONLY one model of the phone. Also, the Recess Slot which also become Big limited to fit one and ONLY one phone.

FACT (0025) As illustrated in FIG. 2, the recess 42 is provided on the top surface of the support 12 for receiving the media player 100. A plurality of contacts 44 are formed at the base or on a Wall of the recess 42.

7. '9530 Only can charge one and ONLY ONE phone because (A) Recess (42) size is fixed (B) The contact (44) need align precisely to the phone contact so can charge one and Only One. Not like Ivan the charging port is common USB-Port !!

FACT☐ (0026) Recess 42 is shaped to snugly receive a lower portion of media device 100 so as to align or matingly couple electrical contacts 46 on the media device 100 With contacts 44 of support 12, and thereby act as a socket for media device 100. Contact between contacts 44 of support 12 and contacts on media device 100 (not shown) for example may permit a rechargeable battery housed Wholly Within media device 100 to charge. Contacts 44 and media device 100 contacts are adapted to matingly couple With each other so that DC voltage can be supplied to the rechargeable battery of media device 100 for charging through the coupled contacts 44 and media device 100 contacts. In addition, if the media player 100 includes audio output contacts in proximity to the charging contacts, ones of coupled contacts 44 may be connected to speakers 15a and 15b via an internal cable (not shown) as an alternative to audio output cable 17.

8. '9530 The LEE unit only can charge one and ONLY One phone and the charge contact all is Custom Pin-Out type. Ivan items has USB-Port which can work with any USB-Port charging wires to connect with the Other electric device and digital device.

FACT[0027] In accordance With an alternative arrangement of the present invention and With reference to FIG. 4, a charging circuit is excluded from lighting apparatus 10, and contacts 44 are electrically connected to a socket 50 disposed on an exterior surface of support 12. Connection between contacts 44 and socket 50 are provided through internally disposed cable 51.

9. '9530 LEE use custom Pin-Out construction on the contact (44) and Outer socket (50) which same as LEE Example iPod wires for custom pin-out so can fit and charge one and only One phone . . . Not like the other end on the computer as USB-port which Ivan patent claimed.

FACT(0027) Line 2 Socket 50 is adapted to inter face With the charging and/or data cable associated With media player 100. For example, an IPod media player sold by Apple Inc. typically employs a cable to connect the IPod to a computer via the computer's USB port. This cable has a custom pinout on one end Which connects to the IPod device and a USB connection on the other end Which mates With the USB port on a computer.

10. '9530 LEE device can transmit BOTH DATA and CHARGING. This is not happen at Ivan item because Ivan item only has the CHARGING FUNCTION. This is not same on basic CHARGING of CHARGER DEVICE !! So this is totally different with Ivan's CHARGER patent.

Fact (0027) Line 14 to 19 The cable allows both transmission of data between the computer and the IPod and charging of the IPod's internal battery through the USB port on the computer.

11. '9530 LEE device cable is associated audio media device & get power from the inner charging-circuit and get power from CUSTOM PIN-OUT contact (44) or Outer socket (50)☐ This is totally different with Ivan's can charge and ONLY CHARGE many different electric or digital device. Not one and ONLY one as LEE claimed and details description for AUDIO MEDIA DEVICE (100).

FACT☐(0027) Line 2 Socket 50 is adapted to inter face With the charging and/or data cable associated With media player 100.

SO From Above (11) points different with LEE (2006-020-9530), The current invention any issued or co-pending filing no any same or similar with LEE's '9530. Furthermore, the '9530 on 2006 is no charging capability over 1.0 Amp as wiki report shown all the history and data so the charring capability and Not allowed the Digital or electric data to delivery on old date 2006, so that is not like current invention for quickly charge USB Charging-Port as above discussion and wiki data!

Also, The (2006-020-9530) for contact (44) and Outer socket (50) has below text;

The said USB receiving end (USB port) is one end of USB-Charging cable which same as all laptop computer USB receiving end, not USB custom pin-out, not USB mini, Not USB compact, Not USB other name which is the other end of the said USB-Charging cable which only fit for limited number of the electric or digital device.

9. US abandonment public prior art US 2009-006-7161

The Foldable mirror set is not Desktop installation. That is travel unit not let people to install on desktop surface always.

The Power from the Computer and which is not quickly charger and has very limited current less than 500 ma not like current invention has minimum 1.0 Amp up to 5 Amp for definition of the USB Charging-Ports release on 2007 and update on 2010.

Also, the computer USB is not charger into the Foldable mirror into foldable mirrors' internal rechargeable battery. The Computer is SUPPLY the current to the foldable mirror while the USB Male plug into the computer ports and has power. Not charging into rechargeable battery and storage inside the rechargeable ready to use.

The foldable mirror had no any internal transformer to change incoming AC current to DC current.

The foldable mirror had no outside transformer get power from outlet AC power source.

So this prior art is nothing to do with current invention.

Hereof, To clear make definition for the above discussed many type of the Chargers and each type has its own USB or Outlet specification such as USB-1.0, USB-2.0, or new standard for USB-3.0 or Outlet for 1,850 Watt, 1,650 Watt as convention market available type which all fall within the current invention scope and claims but these specification is well known and not related to the current invention's parts-name definition as below:

1. USB-unit Charger: The Unit means it is an individual charger has only charger purpose to have one input-current and passing though inner own circuit to make input current change to one output current to charger other device from its own USB charging-port(s). This unit can be housed or without any hosing and install within the said desk-top housing and all live-wired or electric-carried parts & accessories not touchable by people except the USB-port(s). Here said CHARGING purpose is to has higher electric voltage from circuit and overcome the be-charged energy storage unit such as the rechargeable batteries so the energy storage unit can be charged and supply the power to the be-charged device's circuit to use. NOT directly from USB Charging port to SUPPLY the other device DIRECCTLY to the Circuit (lack of Energy storage unit) so can supply power for other device has electricity to make operation. The current USB Charging-port is to Charge only the Energy Storage means, not directly to SUPPLY POWER to other device (lack of energy storage unit).

Also, The current invention's USB-Charging port only take 1 and only 1 of the input power or current and passing through inner circuit to come out the DC current on desired voltage and amperage. It cannot have more than one different input current such as AC or DC current as input current or it will be totally destroy the output current because inner circuit is fixed for one and only one current specification.

Some applications the USB-Unit is just a USB receiving port which connect with the outside housing's transformer, adaptor, inventor, converter which has its built-in circuit to change from AC power source to DC current and from outside housing into the USB conductive receiving-end allow the inserting USB male-prong to insert to deliver the DC current. =>This kind of USB receiving port also is a USB-Unit.

2. Outlet-unit charger: The unit it is an individual POWER SURPPLIER device and only supply power not CHARGE device which has outlet-receptacle(s) which can receive the other device's prongs to deliver or supply the AC current from the OUTSIDE Housing's outlet-unit power source though the outlet-unit's port(s) conductive piece assembly to other device's prong to get into other device's circuit to power other device.

This unit can be housed or without any hosing and install within the said desk-top housing and all live-wired or electric-carried parts & accessories not touchable by people except the Outlet no electric carried outside parts (s).

3. USB-Module Charger: This module is not a single USB-Unit Charger. It will be any combination for any number of the (aaa) USB-Unit(s) or/and (bbb) Outlet-unit(s) has its own number of the USB-port(s) or/and Outlet-port(s) to connect with other electric wires or USB charge cable and by the said wire or cable plugs to plug into electric or digital data device's female receiving-port which may has all kind of custom-pin construction in Type A, Type B, Type C so can charge by USB charging port(s) for supplying the DC or/and by the Outlet-unit(s) for supplying the AC current to other devices(s).

This unit can be housed or without any hosing and install within the said desk-top housing and all live-wired or electric-carried parts & accessories not touchable by people except the non-carry electric parts of the said USB-port(s) and/or Outlet-unit(s).

4. Sealed-unit: This is a unit which has desired combination for any number of USB-unit(s) or/and outlet-unit(s) arrangement or combination and sealed or housing into one piece of the housing, compartment, space, container and the related circuit(s) and construction have to pass each country's required related safety standard(s) and get test labs' certification for this sealed unit or construction for the desktop item. The sealed unit only also can pass the related safety standard and get safety certification by itself of USB or/and Outlet sealed unit which not including the other housing parts or accessories non-related to the USB or Outlet.

This sealed unit any live-wire or electric-carried parts & accessories have to sealed or housing or enclosure within the housing, desktop items, container, space so can pass the US Safety standard requirement(s).

5. Universal Charger: This is charger which has finished housing and electric-contactor such as prong means, or wired, or quickly-connector(s) which not only can incorporate with the said desk-top items but it also can use for other applications. One of preferred embodiment is market available USB-2.1 Amp Charger has 3 USB-ports with fixed or foldable traveling prongs. This can install within the current invention desk-items housing by wired or outlets or conductive piece assembly and it also can take apart from the desk-top item's housing and carry with people to plug-into Wall outlets anywhere to charger the computer, communication, consumer electric items or any electric or digital data devices while prong means plug-into outlet on wall or power strip's outlets. This is definition for universal charger for current desk-top items.

6. USB female receiving means on the desktop items=It equivalent to (USB-Charging-ports released on 2007 and upgrade on 2009) to receiving the USB male plugs from USB-wire, USB-cable which has 2 male plugs on 2 wire/cable ends. One is for Type A and one end may for Min-USB or Micro-USB or other custom-pin construction which are same as be-charged device's USB-Female receiving port so can though the USB wire or USB cable or Jump cable or Bridge cable to build the electric current delivery from the desktop USB Charging-ports to charge the other device's inner energy storage items which is rechargeable battery, recharge battery assembly or any type of energy storage device which offer the electricity to desktop item electricity.

The current invention USB Charging-port has big charging capacity min. over 1.0 Amp up 5 Amp or more which as above discussed USB Charging-port standard release on 2007 and upgrade on 2009. Most important is current invention USB Charging-port only for Charging function and DO NOT have any electric data delivery. Or/This will slow down the charging speed or make overheat or whatever bad for the said current invention.

7. A USB female receiving means including a USB-port capable of receiving a USB male prong means to enable electric current delivery.

8. An outlet female receiving means including an outlet port capable of receiving another electric or digital data device's prong means so as to deliver AC current from the outlet-port(s) to the other electric or digital data device.

9. Desktop items, which may include products having an LED or other light source, such as an LED or other light source that serves as an indicator light to show charging or charging status, or an LED light source for supplying LED light beams for reading. The other light source may be a bulb, an incandescent bulb, a CFL, an energy saving bulb, a fluorescent tube, a PL light, or any other light source available from the marketplace.

10. A base of the light device, including any adjacent pole, bar, stand, step, curved surface, edge, and/or contour other than the light source itself or a shade. A USB-port, USB-unit, USB-module, outlet-port, outlet-unit, outlet-module, sealed-unit, universal-unit, or rotatable module can fit within or be installed anywhere on the base of the light device, which may include any kind of light source such as a bulb, incandescent bulb, fluorescent light, LED bulb, LED tube, or an EL, OEL, or organic EL element.

BRIEF DESCRIPTION OF THE DRAWINGS

FIG. 1 is a front view of desk top items with LED light source having current invention definition for USB-unit(s) has USB charging-port(s) release spec which can charge energy storage unit or assembly up to 1.0 Amp or higher which USB Charging ports only can charge the energy storage unit or assembly without any digital data transmit functions. The $1^{st}$ embodiment can charge rechargeable batteries inside other electric or digital data device(s) minimum from 1.0 Amp or higher as definition of USB Charging-ports and, according to a first preferred embodiment of the invention, which has 2 USB-units and 1 outlet-unit, 12 LEDs, and is powered by a USB plug-wire means from the AC to DC outside housing transformer, or adaptor, or invertor, or converter which already change the AC current to DC current from AC outlets which can supply more higher than 1.0 Amp so can work with definition USB charging-port which has min. 1.0 A up to higher amperage after 2007 and reissue on 2010.

FIG. 2 is a side view of the desk top items of the first preferred embodiment, the inner side of the 12 LEDs is a mirror or magnify lens or magnify mirror which can show the image to let people to see or magnify lens make the lighted objects to become super big size to let people can easily read and use the flexible house to ben to fix distance against the tiny objects to let people not hold by hand for long time.

FIG. 3 shows a first design of a second preferred embodiment of the invention having the outside transformer, or adaptor, or invertor AC power source which get power from the any kind of outlet by prongs and the said desk top item having 3 receiving-ends including 2 USB Charging-port(s) USB-unit(s) or one Big USB-Module inside the housing with different power output (2 USB units has 3 USB-ports and 1 outlet-unit has 1 outlet-port) to charge the energy storage unit or assembly by USB Charging-ports or SUPPLY Power by outlet-unit for different electric or digital data device(s), for example 1,000 ma, 2,100 ma (D.C. current output from 2 USB-units has 3 USB charging-ports) and A.C. current output from the 1 outlet-unit to SUPPLY charge different electric or digital data device(s) such as an iPhone™ and iPad™ for DC current by USB-unit's USB Charging-port(s) and other device such as laptop computer for AC current by outlet-unit to get the different requirements for charging DC or SUPPLY AC current. Here of the Desk lamp has the light source available from market place for any desire type including bulb, CFL, fluorescent tube, or Energy saving light source, EL or OEL, LED . . . and all the light source have to install on the inside lamp holder or PCB holder.

FIG. 4 shows a second design of the second preferred embodiment, which has 2 USB-units has 2 USB charging-ports and 1 outlet-unit has 1 outlet-port to allow people to charge or supply power to, for example, DC current from USB Charging-ports for an iPad™ iPhone™, and AC current from outlet-port for laptop computer or other device which can get power from the outlet-unit. The USB-unit get power from outside transformer, adaptor, inverter to get desired DC current and the outlet-unit get power while prong connect with wall-outlets and directly deliver AC current same as wall outlets current to outlet-unit. Hereof, the Desk lamp is non-LED light source lighting or one piece super powered LED light source or plurality of LEDs install on PCB.

FIG. 5 shows a third preferred embodiment of a desk top item in the form of an LED lighting fixture with adjustable arms to enable adjustment of the height, orientation, direction, and/or angle of the LED lamp to provide the best illumination. The built-in 1 USB-unit has 1 USB charging-port has minimum 1.0 Amp or higher charging capability and 1 outlet-unit has 1 outlet-port has a lower cost than the above-discussed items with a plurality of USB-units and outlet-units, and is powered by a UL listed adaptor OR transformer plugged into a wall outlet that supplies 120 Volt AC current and transfer to DC current for USB-unit has 1 USB charging-port, rather than by a USB plug and wire for out-of-date earlier than USB Charging-ports definition release on 2007 and update on 2010 for charging higher than computer old-USB port only supply 500 ma and had heat issues and problem. The 2007 and 2010 new USB Charging-ports has minimum charging capability 1.0 Amp up to 5 Amp and Not Allow the digital data delivery while Charging the said energy-storage unit or assembly which may is a rechargeable batteries. Any out-of-date before 2007 USB charger is not possible get safety and steady and quickly charger compare with 2007 release and 2010 update for new USB Charging-ports which has non-over heat and cannot do digital data delivery while charging.

FIG. 6 shows a fourth preferred embodiment which is powered by solar power and stores the solar electricity inside rechargeable batteries to provide enough power to charge other electric or digital data device(s) through built-in USB-unit(s) and outlet-unit(s) incorporated with proper circuit, or controller for quickly charging capacity, or voltage pump-up circuit, means so as to meet market requirements. The current embodiment, the Solar or chemical powered Desk lamp which get current from Solar or Chemical already is DC current so no need transformer to make the current change from AC to DC.

FIG. 7 also shows the fourth preferred embodiment, which The big base of the Desk top item has sufficient space within so can install all kind of USB-unit(s), Outlet-unit(s), USB-module(s), Outlet-module(s), Sealed-unit has number of the said USB-unit(s) outlet(s) and/or Outlet-unit(s), Universal unit has number of the said USB-units outlet(s) and/or Outlet-unit(s) has relatively universal compartment, or space, or room to fit within, The said such big base of the desk top item can also be powered by wind power, chemical power, battery power, a generator, transformer, adaptor, inverter, inductor, etc.

FIG. 8 shows the first preferred embodiment incorporate with different light source application (Light source is not shown), which has a thicker or higher base to provide a bigger space to arrange bigger size electric parts and accessories to save the cost of super compact, slim, or cute electric parts and accessories, and which also can load rotating USB-unit(s) or a rotating USB-Module so that a first surface of the USB-module will look nice when the USB-unit(s) or USB-Module is not in use. Details of the rotating USB module are shown in FIGS. 18, 19, 20, 21, and 22

FIGS. 9, 10, 11, and 12 show fifth and sixth preferred embodiments in which desk top items with LED means also have a thicker or higher base, and which can add rotating USB-modules with a plurality of USB-unit(s) or/and Outlet-unit(s) or/and a plurality of other receiving means (hereafter as other-ports) to increase the number of function(s), feature(s), effect(s), and/or performance(s), the USB-module having more than 1 surface and the capability of changing the surface for different purposes.

From the FIG. 9 shown the any kind of light source desk lamp which has 2 rotatable Module and each of rotatable module has built-in desire number of the USB-Units or/and Outlet-unit or/and USB-Module or/and Outlet-module or/and sealed-unit or/and universal-unit to get desired functions. It also has switch means to turn-on or turn-off the said Light source for desk lamp. The base has LED indicator light on the rotatable module's surface to shown the charging status.

Figure 10:
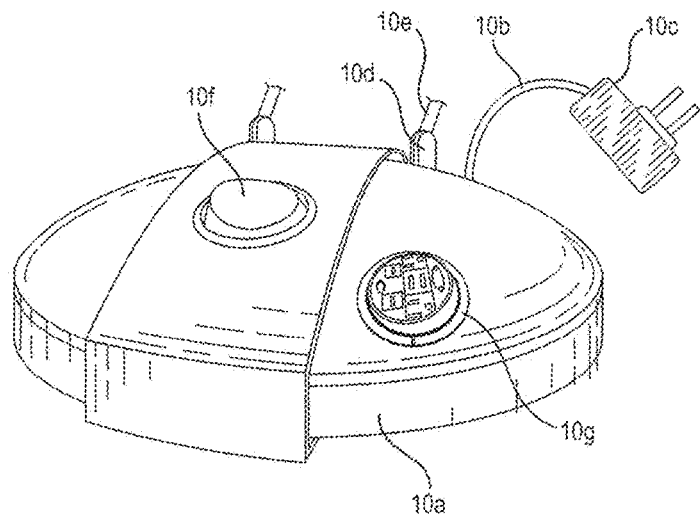

From the FIG. 10 shown the thicker and curved base for Desk lamp has desire light source for illumination. The desk lamp has wired plug to connect with wall-outlet and has AC current input into inner circuit to transfer the wall-outlet's 120V 60 Hz current into USB-unit(s) needed the DC current and also supply the wall-outlet's 120V 60 hz current to the Outlet-unit(s). The said bulb, incandescent light, florescent light or CFL light source is turn-on or turn-off by the switch or sensor or remote control, or wireless, or Bluetooth, or wifi controller with update APP software can download from internet or other network so receiver are install means on the base surface.

Figure 11:
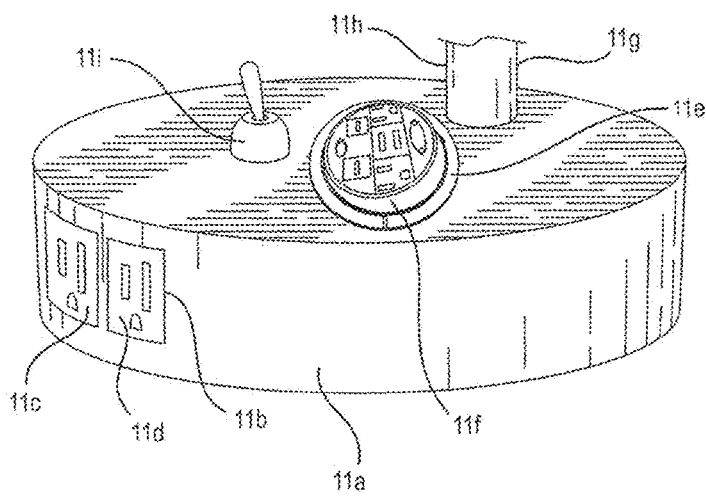

From The FIG. 11, shown the base of the said Desk top lighting which may has any type of the light source which has the Rotatable module which has desire number of USB-Unit(s) or/and outlet-unit(s) and optional LED means for charging status indicator lighting. The said base not only has rotatable module and but also has additional outlet-unit or outlet-module(s) to allow to charge or supply AC power to the other electric or digital device which need AC current input to make operation.

Figure 12:
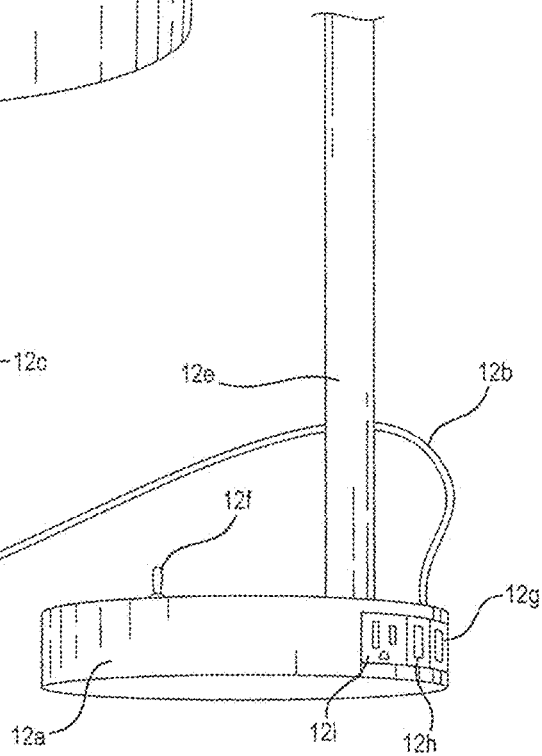

From the FIG. 12 also shown the preferred embodiment which the said Desk Top item for preferred light source may select from bulb, CFL, incandescent as light source which has big base and the rear-side has plurality of the outlet-unit(s) from Number 1 to any number so it can connect with other electric or digital data devices to supply or charge the other devices. The transformer, adaptor, inverter not only supply the DC current to the USB-units but also supply AC current to the said plurality of the AC Outlet-unit(s) furthermore the plurality of the outlet-unit(s) or Outlet-Module(s) also can add the safety protection function such as surge protection like extension cord had. The same application can apply for all base of the lighting device so can have nice wires arrangement for plurality of outlet-unit(s) or Outlet-module (s) on the said base of all kind of lighting device.

Figure 13:
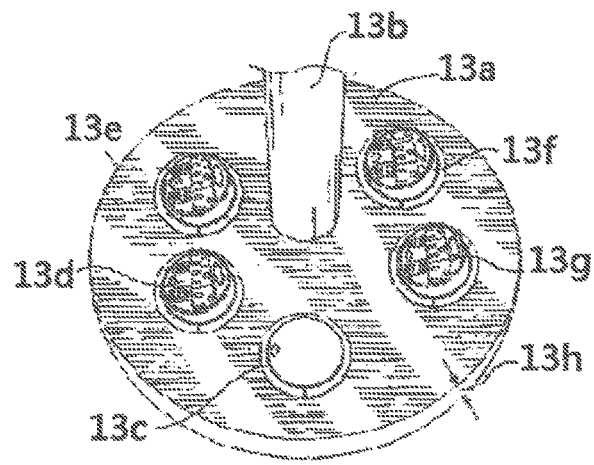

FIG. 13 shows a desk top item which has a super big base size so that a plurality of rotating USB-modules can be installed to enable a group of people to charge their electric or digital device(s) at the same time by the USB-unit(s) or USB-Module(s) or SUPPLY AC current by Outlet-Unit(s) or Outlet-Module(s), such as for use in a train station, bus station, airport, meeting room, hotel lobby . . . etc.

Figure 14:
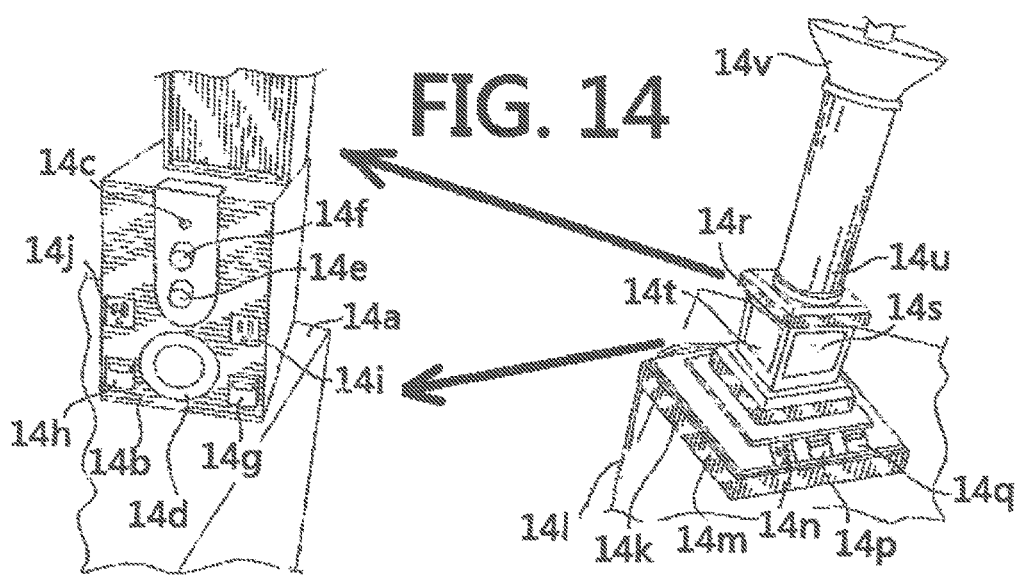

FIG. 14 shows desk top items with LED means having USB-unit(s), USB-module, or outlet-unit(s) to allow people to charge energy-storage unit or assembly inside the other electric or digital device(s) by USB-unit(s) or USB-Module(s), or supply the AC current to prong(s) device by outlet-unit(s) or outlet-module(s), the items including for example a radio, time piece, weather station display, fruit blender, food machine, liquid machine, LED lighting, light fixture, image projector, image, electric fan, heater or any conventional items with LED means built-in to offer the area illumination, or shown digital time, or shown image, or shown the charging status. The said other functions or the said USB-unit(s) or Outlet-unit(s) can install on the anywhere of the base, pole, steps, flat areas of the said Desk top items and not limited only on the base one surface.

Figure 15:
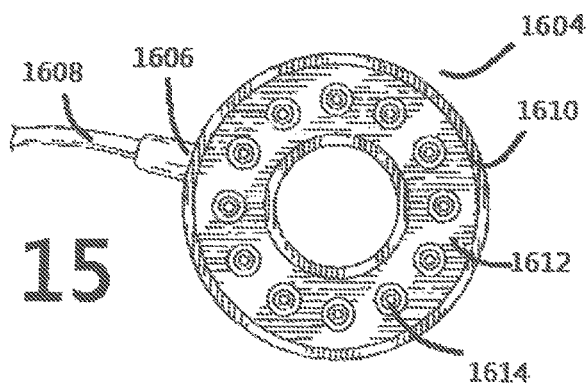
Figure 16:
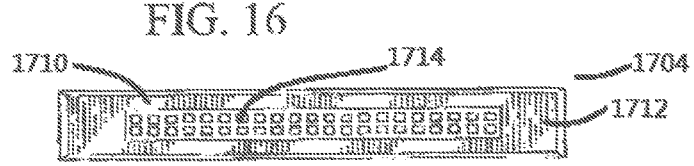
Figure 17:
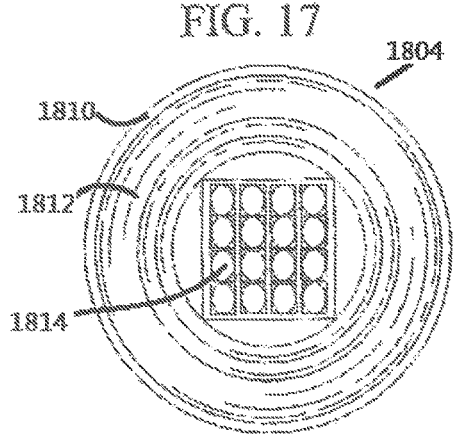
Figure 18:
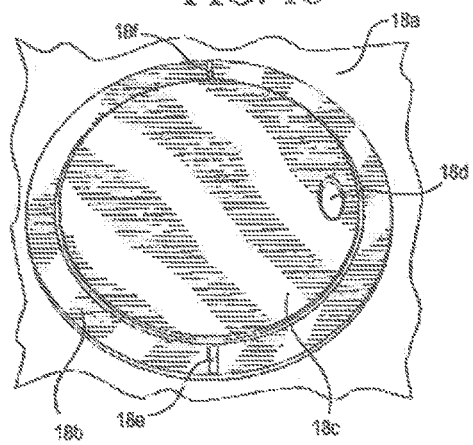

FIGS. 15, 16, and 17 show different LEDs means arrangement which used for LED lighting one of function(s) for offering the area illumination in the above-discussed preferred embodiments or other desk top items.

FIGS. 18, 19, 20, 21, and 22 show details of a USB-module with at least one USB-units and a plurality of additional receiving means (hereafter as Additional-ports) such as USB-unit(s), outlet-unit(s), Internet-unit(s), adaptor-unit(s), other light source means, or other light sources with appropriate parts and accessories.

FIGS. 23, 24, 25, 26, 27, 28, and 29 show all kinds of desk top items which offer function(s), effects(s), and/or performance(s) to people's eye, nose, mouth, and/or ears for a period of time while people are working, resting, sleeping, or standing.

Figure 30:
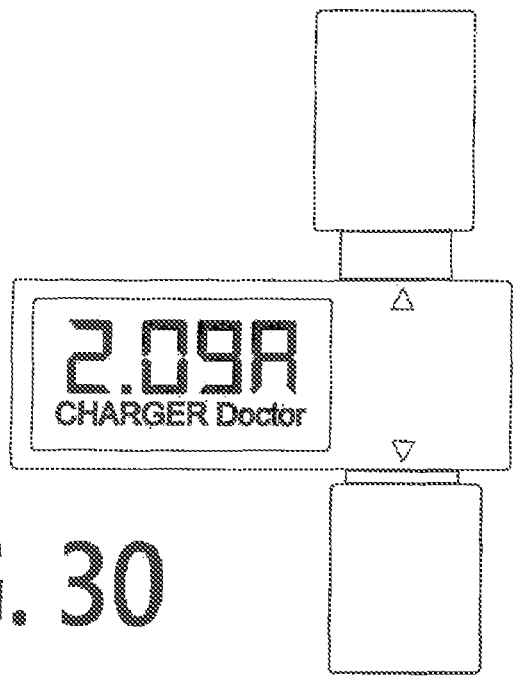
Figure 31:
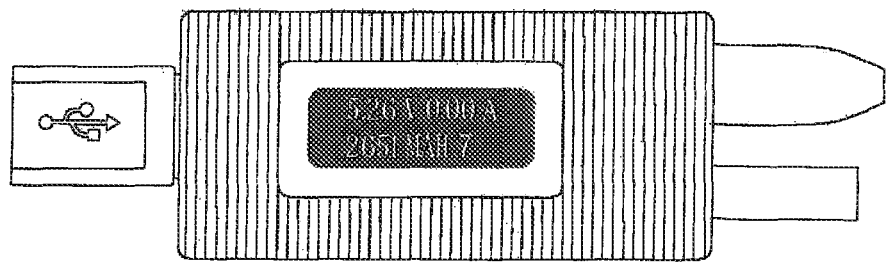

FIGS. 30 and 31 respectively show a small gadget that provides voltage and current readouts for devices charged over USB, and a USB power meter that additionally provides a charge readout (in mAh) and data logging.

Page A, B, C, D to show the some preferred embodiment for the above discussed for parts as below listed.

1. Page (A) (1) USB-unit: The Unit means it is an individual charger has only charger purpose to have one input-current and passing though inner own circuit to make input current change to one output current to charger other device from its own USB port(s). This unit can be housed or without any hosing and install within the said desk-top housing and all live-wired or electric-carried parts & accessories not touchable by people except the USB-port(s).

The Charger only take 1 and only 1 of the input power or current and passing through inner circuit to come out the DC current on desired voltage and amperage. It cannot have more than one different input current such as AC or DC current as input current or it will be totally destroy the output current because inner circuit is fixed for one and only one current specification.

Page A (2) USB-Module: This module is not a single USB-Unit Charger. It will be any combination for any number of the USB-Unit(s) or/and Outlet-unit(s) has its own number of the USB-port(s) or/and Outlet-port(s) to connect with other electric or digital data device's mail prong(s) or Plug(s) to charging or supplying the DC or/and AC current to other devices(s). This unit can be housed or without any hosing and install within the said desk-top housing and all live-wired or electric-carried parts & accessories not touchable by people except the USB-port(s).

Page B (3) Outlet-unit and Outlet Module: The unit it is an individual POWER SUPPLIER device has outlet-receptacle which can receive the other device's prongs to deliver or supply the AC current from the outlet-unit's power source though the outlet-unit's port(s) to other device's prong to get into other device's circuit to power other device. This unit can be housed or without any hosing and install within the said desk-top housing and all live-wired or electric-carried parts & accessories not touchable by people except the USB-port(s).

Page C (4) Sealed-unit: This is a unit which has desired combination for any number of USB-unit(s) or/and outlet-unit(s) arrangement or combination and sealed into one piece of the housing and passed all USA required related safety standard(s) and get test labs' certification for this sealed unit only which not including the other housing parts or accessories non-related to the USB or Outlet charger. This sealed unit any live-wire or electric-carried parts & accessories have to sealed so called sealed unit so can pass the US Safety standard requirement(s).

Page C (5) Universal Charger: This is charger which has finished housing and electric-contactor such as prong means, or wired, or quickly-connector(s) which not only can incorporate with the said desk-top items but it also can use for other applications. One of preferred embodiment is market available USB-2.1 Amp Charger has 3 USB-ports with prongs. This can install within the current invention desk-items housing by wired or outlets and it also can take apart from the desk-top item's housing and carry with people to plug-into Wall outlets to charger the computer, communication, consumer electric items or any electric or digital data devices while prong means plug-into outlet on wall or power strip's outlets. This is definition for universal charger for current desk-top items.

DETAILED DESCRIPTION OF THE PREFERRED EMBODIMENTS

The present invention provides improvements over the sealed-units disclosed in U.S. patent application Ser. Nos. 12/502,661, 12/292,580, 12/566,322, 11/498,874, 11/527,629, 12/622,000, and 12/624,621, which have uniform dimensions and shapes to fit into the same uniformly dimensioned compartment and thereby enable the universal sealed-unit to fit into a variety of LED light devices. This invention has more features, functions, and effects to allow people to buy any electric device or digital data device with the additional convenience of including outlet-unit(s) to supply electric power to other device(s), or USB-unit(s) to supply different types of electric power to other device(s). The current invention uses a universal module which can have any combination of the following parts or accessories, including: circuit, conductive piece, contactor, receiving ends, output-ends, input-ends, electric parts and accessories, prong(s), rotating kits, cable with a plug, cable with USB-plug(s), printed circuit board, flexible printed circuit board, wires, a cable, a digital data cable, a conductive piece, or any related electric parts or accessories available from the marketplace to get electric power from a prong-cable, USB-cable has USB-plug(s), prong(s), or USB-receiving port has all kind of custom-Pins, outlet-unit's or USB-unit's receiving-end(s) (hereafter as outlet-ports or USB-ports) and supply power to a variety of electric devices.

The universal module has a same power-supplying function as the "sealed-unit" for the "LED light devices" described in the inventor's issued U.S. Pat. No. 8,342,732 (·I-1), U.S. Pat. No. 8,305,846 (#J-2), U.S. Pat. No. 8,231,246 (#EE-1), U.S. Pat. No. 8,002,456 (#GG-08), U.S. Pat. No. 7,726,839 (#V-08), U.S. Pat. No. 7,726,841 (#W-08), U.S. Pat. No. 7,726,869 (#Y-08), U.S. Pat. No. 7,618,150 (#S-07), and U.S. Pat. No. 7,722,230 (#AA-08) and U.S. patent application Ser. No. 12/566,322 (#M-1), Ser. No. 12/073,889 (#X-08), Ser. No. 12/894,865 (#T-1), Ser. No. 12/003,809 (#V-08) or the "outlet device" of the inventor's U.S. Pat. No. 7,824,185 (#BB-08). Furthermore, the interchangeable "sealed-unit or battery-pack" of the inventor's U.S. patent application Ser. No. 12/622,000 (#HH-09), Ser. No. 12/295,562 (#HH-1) also utilizes concepts shared by the present invention.

FIG. 1 is a front view of a desk top item (1 a) with LED (1 h)(1 i) and USB-unit(s) (1 d)(1 e) has USB Charging-port(s) as above discuss specification released on 2007 and upgrade on 2010 which can have charging capacity minimum 1.0 Amp up to 5 Amp or higher however The USB Charging-port(s) cannot have digital data or electric data delivery while need such big and quickly charging speed. So before 2007 all the charging from the out-of-date USB port is too small and less only 500 ma or lower charging capability and may has the overheating for fire risk. So from 2007 to 2010 come out the current invention's said (USB charging-ports) has more strictly for USB Charging port(s) material and all details so can allow to quickly charging from minimum 1.0 A to 5.0 Amp and from 2007 to 2015 come out more higher for 2.1 Amp or 2.4 Amp.

The current inventions disclosure the time table and USB development on the above discussion to make clear different for USB Charger limitation before 2007 and also make big difference for any USB Charging-port preferred only has Charging-Function and not have the Digital/electric data delivery while for USB Charging ports if want to get safety and quickly Charging capacity as above reports shown evidence.

From FIG. 1, the USB-Unit(s) (1d) (1e) has USB Charging-ports for charging the energy-storage unit or assembly including the rechargeable batteries (not shown) inside the other electric or digital data device(s) according to a first preferred embodiment of the invention which has 2 USB-units (1 d)(1 e) and 1 outlet-unit (1 f) at the front of the base. The location for the USB-Unit(s) or Outlet-unit(s) preferred to arrange on front of the desktop items' front housing so people can easily to reach without move or turn direction of the items for every time to charge the other device(s). However, for Outlet-unit(s) or Outlet-Module(s) can put on back because it may SUPPLY power to the other electric device(s) such as printer, scanner, Fax machine which can just one time plug and not every day need to plug into the Outlet-unit or Outlet-Module. The laptop carry computer need every day repeat use Outlets-Unit or Outlet-Module so need to put on front or sides for easily operation.

The first preferred embodiment is a 12 LED USB light powered by a USB plug-wire means (1 b) (1 c) which can be a USB-plug (1c) or AC-Plug (not shown) has wire from different power source.

$1^{st}$ type: The USB-Plug Wire can connect with the circuit which outside the desk lamp housing has at least one of the transformer, or adaptor, or invertor, or converter to change the outlet's AC current into DC current at outside circuit housing and outside circuit housing has the USB-receiving port(s) to accepted the USB-Plug-wires to build the DC current delivery from Outside circuit housing to the Desk Lamp housing. Or $2^{nd}$ type: The AC-Plug wire can connect with the AC outlets and get the AC current into the inside desktop housing's circuit which has at least one of the transformer, or adaptor, or invertor, or converter to make the input desktop housing AC current to change to DC current and has other electric parts & accessories to deliver the DC current to said USB Charging-port(s) or/and to LED light source.

The said both $1^{st}$ type or $2^{nd}$ type of USB-Plug wire or AC-plug wire both has the said 2003 specification quickly charger USB charging-ports and includes an adjustment arm (1 g). Hereof, the 12 LEDs is offer the area illumination.

FIG. 2 is a side view of the first preferred embodiment of a desk top item (1 a) with LEDs (2 h)(2 i) showing 1 USB-unit (2 e) and 2 outlet-units (2 d)(2 f) on the side of the base. The LED means has 12 LEDs (2 l) in the USB-Plug-Wire as above discussed $1^{st}$ Type preferred module which powered light (2 h) and is powered from the USB plug-wire mean (2 b)(2 c) and has USB Charging port(s) 2(e), 2(f) to quickly charge the energy storage unit or assembly including rechargeable batteries inside the other electric or digital device.

FIG. 3 a first design of a second preferred embodiment which has 2 USB-unit(s) (3 m)(3N) has USB charging-port(s) (3n) (3m) to charge the energy-storage units or assembly DC current by the said USB Charging-port(s) has minimum 1.0 Amp and an outlet-unit (3 p) has outlet (3p) to supply the AC current to the prong(s) of the said other electric or digital device. Both has different power type and output to charge or supply different electric or digital data device(s).

The USB-unit(s) has USB charging-port(s) which has minimum DC current charging capacity at 1.0 Amp which equivalent 1,000 ma, or higher Amperage such as 2,100 ma units to charge the rechargeable batteries inside of the different electric or digital data device(s) such as an iPhone™ and iPad™ that have different requirement for charging current.

The Outlet-unit (3p) which get power from the outlet's power source which has unlimited AC current and will go through the conductive material and piece or assembly to supply the power to the outlet-unit (3p) at the desktop items housing to the prongs while the prongs of the other electric or digital device insert into the said desk lamp outlet-unit(s).

FIG. 3 shows a first design of a second preferred embodiment of the invention having the outside transformer (3c), or adaptor (3c), or invertor (3c) power source which get power from the outlet (not shown) by prongs (3d) and the said desk top item (3a) having 2 USB-unit(s) (3m) (3n) with different power output (2 USB units has 3 USB-ports) which has its 3 USB Charging-port(s) and everyone has minimum 1.0 A charging capacity to charge the energy-storage unit or assembly including rechargeable batteries inside of the computer, communication, or consumer electric products including the power bank which has a lot of rechargeable batteries assembly inside. such as an iPhone™ and iPad™ for DC current And 1 outlet-unit has 1 outlet-port has different current and to SUPPLY the AC current into the said other electric or digital data device(s)'s while the prong(s) of other device's insert into the said outlet-unit's receiving port(s). other device such as laptop computer for AC current to get the different requirements Here of the Desk lamp has the light source available from market place for any desire type including bulb, CFL, fluorescent tube, or Energy saving light source, EL, OEL, LEDs.

FIG. 4 shows a second design of the second preferred embodiment which has 2 USB-units and 1 outlet-unit to allow people to charge DC current power to an iPad™, iPhone™ by the USB Charging port(s), or supply power to the laptop computer, or other device by outlet-unit(s) or outlet-Module(s). Both can get power from the USB-unit(s) or outlet-Unit. The drawing also shows the differences between the first and second preferred embodiments. All such alternative designs, and any improvements or devices with an equivalent function or that are replaceable by the preferred items will still fall within the scope of the current invention, including variations disclosed in the inventor's other patents and patent applications may also fall within the scope of the current invention.

The difference or variation or replaceable or alternative or replaceable including following parts for current invention;
(a) Light source
(b) installation location
(c) Installation space, compartment, room, housing, construction
(d) USB Charging-port 1.0A, 2.1A, 3.1A, 1.2A, 2.4A, 3.6A, 4.2A, 4.8A or any combination for the USB ports
(e) Power source come from: (e-1) AC Plug wire, (e-2) USB plug wire, (e-3) Outside housing Transformer, or invertor, or adaptor, or converter (e-4)
(f) Function of desk top items: as above discussed products.

FIG. 4 shows a second design of the second preferred embodiment, which has 2 USB-units has 2 USB-ports and 1 outlet-unit has 1 outlet-port to allow people to supply power to, for example, DC current from USB-ports for an iPad™, iPhone™, and AC current from outlet-port for laptop computer or other device which can get power from the USB-units or outlet-unit. The USB-unit get power from outside transformer (4c), adaptor (4c), inverter (4c) to get desired DC current and the outlet-unit get power while prong (4d) connect with wall-outlets and directly deliver AC current same as wall-outlets current to outlet-unit. Hereof, the Desk lamp is non-LED light source lighting, it may be bulb, incandescent bulb, CFL, Energy saving bulb, or any other market available light source.

FIG. 5 shows a third preferred embodiment of a desk top item in the form of an LED lighting fixture (5 *a*) with adjustable arms (5 *g*)-(5 *j*) to enable the LED lamp to be moved to a desired height, orientation, direction, and/or angle to get the best illumination to people. The built-in 1 USB-unit (5 *e*) and 1 outlet-unit (5 *f*) have a lower cost than other above-discussed USB-units and outlet-units because they do not need to be made as compact. The desk top item is powered the transformer (5 *c*)(5 *d*) or a UL listed adaptor (5 *c*)(5 *d*) that receives power from a wall-outlet for 120 Volt AC current rather than the USB plug and wire of the first preferred embodiment. This kind of DC current already changed from AC to DC current can save a lot of work and labor for inner circuit because no need change AC to DC inside the desk top items housing. The inside housing circuit can be a simple or add other functions such as light sensor, photo sensor, motion sensor, blue tooth, infrared wireless controller, wireless controller with Wifi, APP software controller, or other wired or wireless operation, color changing, brightness changing, timer, time delay, image display, project image display, optics filter to reduce glare for vision improvement or other added functions, features, performance, effects for people eye, nose, mouth, ear, skin, body to make people more convince to use the desktop items has built-in USB-Unit, USB-Module, sealed unit, universal unit, outlet-unit, Outlet-module as above discussed.

Other features is this desktop items become universal model for all over the world so no need to change any inner circuit just change the outside housing transformer, or invertor, or adaptor, or converter specification and prong(s) specification, then, same desktop items with same inner circuit can sell all over the word.

FIG. 5 shows a third preferred embodiment of a desk top item has built-in 1 USB-unit (5*a*) has 1 USB-port and 1 outlet-unit (5*f*) has 1 outlet-port has a lower cost than the above-discussed items with a plurality of USB-units and outlet-units, and is powered by a UL listed adaptor OR a transformer plugged into a wall-outlet (not shown) that supplies 120 Volt AC current and transfer to DC current for USB-unit (5*e*) has 1 USB-port, rather than by a USB plug and wire (2*b*)(2*c*) or (1*b*) (1*c*). Whenever change the outside housing transformer, or adaptor, or invertor, or convertor and prong(s) specification even no need to change simple inner circuit can sell same function unit to all over the word. It also because the all AC to DC current change is made outside of desktop housing so the base or housing or unit of the said simple inner circuit will reduce to very slim and thin to make more value looking for sales!

FIG. 6 shows a fourth preferred embodiment which is powered by a solar power array (6 *b*) and which stores the solar electricity inside rechargeable batteries that have enough power to charge other electric or digital data device(s) though the built-in USB-unit(s) (6 *i*)(6 *h*) and outlet-unit (6 *j*) having appropriate circuit means to meet market requirements.

It also can incorporate with the co-inventor's pending filing to use the inventor's pump up inner rechargeable batteries output-end voltage so can charge the higher voltage of the desk lamp items' input-current voltage.

FIG. 7 also shows the fourth preferred embodiment, which the desk top items is a desk lamp can also be powered by other available power sources including wind power, chemical power, battery power, a generator, a transformer, adaptors, an inverter, an inductor, etc. FIG. 7 also shows the fourth preferred embodiment, which The big base (7*a*) of the Desk top item has sufficient space within so can install all kind of USB-unit(s), Outlet-unit(s), USB-module(s), Outlet-module(s), Sealed-unit has number of the said USB-outlet(s) and/or Outlet-unit(s), Universal unit has number of the said USB-outlet(s) and/or Outlet-unit(s) has relatively universal compartment to fit within, The said such big base (7*a*) of the desk top item can also be powered by wind power, chemical power, battery power, a generator, transformer, adaptor, inverter, inductor from the cable (7*e*).

FIG. 8 shows that the base of the desk top item of the first preferred embodiment incorporate with different light source application (Light source is not shown) may be made thicker or higher to accommodate bigger size electric parts and accessories to save a lot of the cost of super compact, slim, or cute size electric parts and accessories. Furthermore, the thicker or higher base can also accommodate a rotating USB-unit(s) or USB-module that can be rotated from a first surface to a second surface so that the first surface of the USB-module will look nice when the USB-unit(s) or module is not in use. Details of the rotating USB module can be understood from FIGS. 18, 19, 20, 21, and 22, the details of which are explained in the inventor's co-pending U.S. patent application Ser. No. 13/117,227 (#FFF-11) and Ser. No. 12,950,017 (#CCC-10). It will be appreciated that the details disclosed in the co-pending application may be applied to the present embodiments without departing from the scope of the current invention.

All the above discussed the USB Charging-port(s) of current invention as the definition released on 2007 and update 2010 for (AAA) Quick charger which minimum had 1.0 Amp to 5.0 Amp charging capability (BBB) While quickly charger with higher over 1.0 Amp capacity, not allow for any digital or electric data transit or deliver by same USB-unit or USB-Module or USB Charging-ports (CCC) the out of date earlier than 2006 has limited for charging capacity less than 500 ma or so and has risk for overheat because the USB-ports the specification or construction or conductive cross section is too few to carry bigger current go thought and cause over-heat and has fire risk (DDD) The USB charging ports of current invention only allow one of input current not workable for more than one input current such as sometime is AC and while power fail use DC battery power as input power (EEE) The USB charging ports as current invention only has Charge DC current by USB-port or SUPPLY AC power by Outlet unit. No any digital/electric data delivery or transmit for quickly charger USB-Port as current invention (FFF) The current invention has housing, space, compartment, room to install the said circuit and related electric parts & accessories inside the desktop housing (GGG) The current invention has movable, removable, Universal USB-Charger unit can install, movable, removable, replace feature too. (HHH) The current invention USB-Charging ports incorporate with jump-wire or bridge-wire or USB-wires has 2 male plug and one plug into the Desktop USB charging-ports and one other male-plug into the Other device's USB-Plug receiving ends (device's USB-port) to make the current delivery from Desktop to the other device. (III) The said USB-Wires has 2 mail plugs, The 2 male plug can be any type including Type A, Type B, Type C for construction. (JJJ) The said USB-Wire has 2 male plugs, the everyone plug need to match the USB-female receiving ports for Pins. Maybe the same or different on the size can be standard Type A, Mini, or Micro USB specification as long as the receiving-end match the Plug-in-end for pins.

FIGS. 9, 10, 11, and 12 show fifth and sixth preferred embodiments which also have a thicker or higher (9h) base for the desk top items with LED means where the LED is an indicator light (9p) for charging status, and to which rotating USB-modules having a plurality of USB-unit(s) and other receiving means (hereafter as other-ports) can be added to increase the number of function(s), feature(s), effects, and/or performance(s). The USB-modules (9 k) to (9 m), (10(g), and (11 e) to (11 f) of these embodiments have more than 1 surface to enable different surfaces to be exposed for different purposes. The more than 1 surface of the USB-module can be any number from 2 to N. From FIG. 9 can see the USB/Outlet module has 2 of the USB-unit(s) (9m) and 3 of Outlet-unit(s) (9n) and one LED charging indicator light (9p) which show people the USB-unit(s) is charging now and one of the marking plate (9l) to show all the 3 outlet-unit(s) max. wattage can use such as 1,650 Watt for all other electric device total rating, but not for 1,850 Watt which is for hair-dryer or heater device. The release (9j) is a locker and also is an elastic-release while touch it the module will automatically rotate from surface (9i) and change to the other surface which has all the USB-Unit (9m) or/and Outlet-unit (9n) or/and other type of receiving means including wifi, internet, phone, digital data, or any other receiving means for electric or digital data device(s). The switch (9f) turn-on and turn-off the said Bulb or CFL or energy-bulb or fluorescent-tube light source of the top part of the desk top items or the other functions on top of the said desk top item. The said electric wire or code and the plug which has no any transformer or adaptor or invertor inside so the current from the Prong (9d) for 120 Volt Alternative current directly to deliver to the inner circuit means to change from AC to DC for USB-unit(s) and at the same time the prong (9d) also deliver the 120 Volt AC current to the rotatable module's Outlet-unit(s) to supply the 120 Volt AC current to other electric device. The same time the function of the top part of the desk top item has its own electric arrangement to keep the original pre-determined or existing functions.

FIGS. 9, 10, 11, and 12 show fifth and sixth preferred embodiments in which desk top items with LED means as charging status indicator light (9p), It also have a thicker or higher (9h) base, and which can add rotating USB-modules with a plurality of USB-unit(s) (9n) or/and Outlet-unit(s) (9m) or/and a plurality of other receiving means (hereafter as other-ports) to increase the number of function(s), feature(s), effect(s), and/or performance(s), the USB-module having more than 1 surface (9i) and the capability of changing the surface for different purposes (9k).

From the FIG. 9 shown the any kind of light source desk lamp (9a) which has 2 rotatable Module (9K) (9j) and each of rotatable module (9k)(9j) has built-in desire number of the
1. USB-Units (9m) or/and
2. Outlet-unit (9n) or/and
3. USB-Module (combine the 2 USB-units into one piece and in one housing or PCB) or/and
4. Outlet-module (combine the 3 outlet-units into one piece and in one housing or PCB) or/and sealed-unit (has more than one of UBS-unit(s) or/and
5. outlet-unit(s)) or/and
6. universal-unit (at least has one USB-unit or/and outlet-units has housing to fit into uniform compartment which within many of the desk top items housing)

to get desired functions. It also has switch means to turn-on or turn-off the said Light source for desk lamp or top part of desk top item's function as existing. The one LED indicator light (9p) on the one of the rotatable module's surface (9k) to shown the charging status.

From the FIG. 10 shown the thicker and curved base for Desk top item which is a desk lamp (10a) has desire light source for illumination. The desk lamp (10a) has wired plug (10b) (10c) to connect with wall-outlet (not shown) and has AC 120 Volt current input into inner circuit (not shown) to transfer the wall-outlet's 120V current into USB-unit(s) needed the DC current and also supply the wall-outlet's 120V current to the Outlet-unit(s). The said bulb, incandescent light, florescent light or CFL or energy saving light source is turn-on or turn-off by the switch (10f) or sensor (10f) or remote control (10f) on the base (10a) top or side of the surface.

From The FIG. 11, shown the base (11a) of the said Desk top lighting which may has any type of the light source (not shown on top part) which has the Rotatable module (11f) which has desire number of USB-Unit(s) or/and outlet-unit(s) and optional LED to shown charging status as indicator light. The said base (11a) not only has rotatable module (11f) and but also has additional outlet-unit or outlet-module(s) (11 c) (11d) to allow to charge or supply AC power to the other electric or digital device which need AC current input to make operation. It also can has more outlet-unit(s) up to 1 to N number (N can be any number) as long as the base can fit within the plurality number of the said Outlet-unit(s) so the current invention's desk top items base (11a) can replace the market existing power-strips which lay on the ground to supply the same 120 Volt current.

From the FIG. 12 also shown the preferred embodiment which the said Desk Top item is a lighting has preferred light source may select from bulb, CFL, incandescent, energy saving bulb or tube as light source which has big base (12a) and the rear-side of base has 3 or plurality of the outlet-unit(s) from Number 1 to any number so it can connect with other electric or digital data devices to supply or charge the other devices. The special design for current invention's transformer (not shown), adaptor (not shown), inverter (not shown) inside or outside base which not only supply the DC current to the USB-units but also supply AC current to the said plurality of the AC Outlet-unit(s) while the said transformer, inverter, adaptor has special design for 120 Volt current not passing though the current changing circuit for the special model for current invention. From FIG. 12 shown the wired plug (12C) has prong (12d) has no any circuit inside so can deliver the wall-outlet 120 Volt direct to the base (11a) 3 outlets to let people to connect with the desk top laptop, or speaker or lava light or other electric or digital devices which need 120 Volt AC current to operation.

The plurality of outlet-units or Outlet-module can install on rear-ends or sides of base of the lighting device so it can have nice and net wires arrangement on the surface such as desk top or floor for floor lamp base. This kind of arrangement for base of lighting device will save people to use a lot of power strips or power cords or extension cord which is ugly and occupied too many wall-outlet space and outlets. This is other feature for current invention has a plurality of Outlet-unit or outlet-module on the base of ling device. It can add the surge protection for such more than 3 outlet-unit or 3 outlet-module so can have 1 more Plus feature of this Outlet-unit on the base of lighting device.

FIG. 13 shows a desk top item (13 a) which has a super big base (13 h) so that a plurality of rotating USB-Modules (13 c) to (13 g) can be installed to enable a group of people to charge their electric or digital device(s) at the same time, such as in a train station, bus station, airport, meeting room, hotel lobby . . . etc.

FIG. 14 shows desk top items with LED means (14c) is a function indicator light to shown the charging status or power-on-off status and USB-unit(s) (14 *h*)(14 *g*)(14 *p*)(14 *q*), USB-module(s), or outlet-unit(s) (14*i*)(14 *j*)(14 *n*) install on the pole or base or part of the said Desk Top items to allow people to charge other electric or digital device(s), the items has at least one of the functions including a radio (14*d*), timepiece (FIG. 27), weather station display (FIG. 27), fruit blender, food machine (FIG. 28), liquid machine (FIG. 25), LED lighting (FIG. 1 to FIG. 6), light fixture (FIG. 7 to FIG. 12), projector means (FIG. 24), electric fan (FIG. 29), heater or any conventional items (FIG. 28) with LED means built-in as indicator light (FIG. 9 to FIG. 11 on module surface) or the said LED means is light source to offer the area illumination (FIG. 1 to 6 as light source), or shown digital time (FIG. 27), or shown image (FIG. 24), or shown the charging status (FIG. 9 to FIG. 11 on module surface). The said other functions or the said USB-unit(s) or Outlet-unit(s) can install on the anywhere of the base, pole, steps, flat areas of the said Desk top items and not limited only on the base one surface as FIG. 14 shown.

FIGS. 15, 16, and 17 show different LEDs used for LED lighting in the above-discussed preferred embodiments or other LED desk lamp or LED lamp for a desk top. From FIGS. 15, 16, 17 and FIGS. 1,2,3,4,6 show some preferred design for LEDs so can get min. paper size of A4 or B2 or much bigger area for desired even or non-reflective photometric effects or brightness or colors to protect people eyes while people reading or working. The single LED-unit is not enough to make the min. paper size of A4 or B2 or more bigger areas has good and even brightness so need the circle, round, donut, linear, lines, rows, array, matrix with proper spacing for plurality LEDs to get minimum paper size of A4 or B2 or bigger areas for good and even brightness and color or other eye-optics requirement for reading.

FIGS. 18, 19, 20, 21, and 22 show details of a USB-Module (18*b*)(19*b*) with at least one USB-unit (19*g*) and a plurality of additional receiving means, which may include a USB-unit(s) (19*h*), outlet-unit(s) (19*i*)(19*j*), internet-unit(s), adaptor-unit(s), other light means, or another light source with appropriate parts and accessories, or any conventional available receiving means, the USB-module having at least more than 2 surface(s) (e.g., surface (18*c*) on one side and the USB-unit(s) on the other side), each surface with its own special design.

FIGS. 23, 24, 25, 26, 27, 28, and 29 show all kinds of desk top items or-and LED desk Lamp which offer function(s), effects(s), performance(s) to people's eyes, nose, mouth, and ears so that people can stay nearby for a period of time as they work, rest, sleep, or stand. The desk top items each have LEDs and USB-unit(s) to charge other electric or digital data device(s) and are arranged to generate, exhibit, or provide (a) light beams, (b) a projected image, (c) a time image, (d) a clock, (e) illumination, (f) music, (g) a AC power source, (h) electric signals, (i) photos, (j) digital signals, (k) air flow at a desired temperature, (l) moisture, steam, (m) smells, (n) liquid, (o) coffee/tea, and/or (p) food, or to serve as any other conventional device that people will stay around for a period of time while their other devices are charging.

Figure 23:
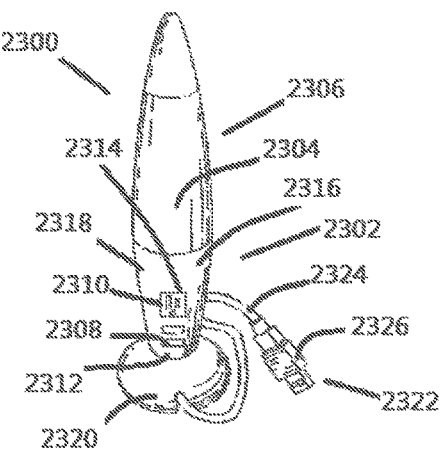
Figure 19:
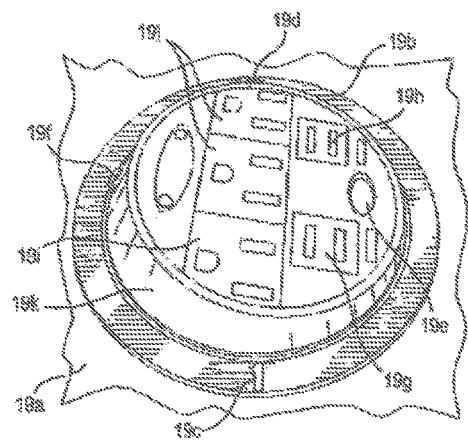
Figure 20:
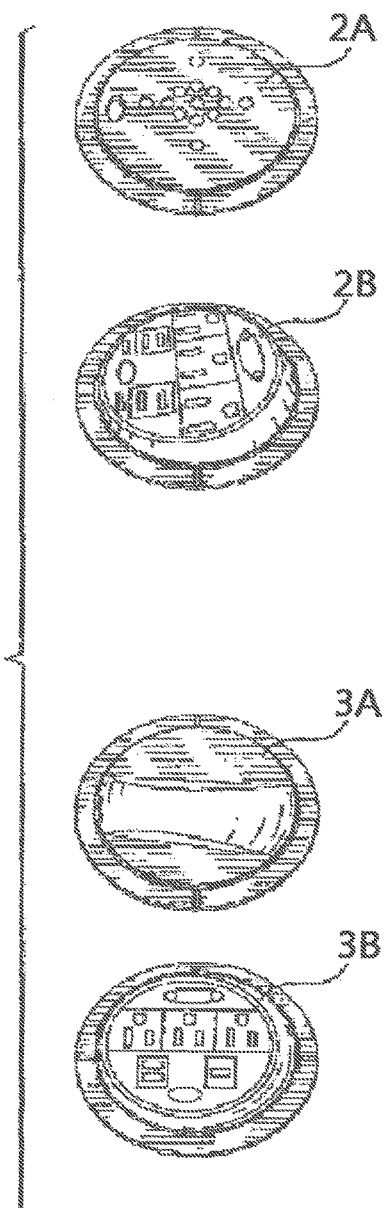

From FIG. 23 show the desk top items (2300) is one of the Liquid light application s which has base (2320) top has cone or collar or tube like compartment (2318) has built-in circuitry to get outside power from male plug (2326) and wire (2324) to input the AC or DC power source into inner circuitry to supply the power to built-in USB-ports (2308) or-and outlet-unit (2310) and inner LED(s) (not shown) and the top is liquid container (2304) which has desired inner liquid or-and optics-units to make the LED light beam to emit sufficient brightness basing on market requirement for reading or accent light or night light. The inner of the top compartment (2304) also can have design inner miniature items such as lava, sea shells, toy, reflectors, glitters . . . etc.

From FIG. 24 show the desk top items (2504) which has the LED(s) inside to offer the top project image or-and lighted pattern functions and also supply LEDs for ball illuminations or-and light beam to make surrounding areas for reading. The said surrounding areas illumination functions similar with LED-bulb which has plurality of LEDs inside to emit light to all directions. The said main-base (2502) is like tower or cone or twin-tower (2516) shape with center big radius so allow the top ball (2500) can be rotating to change the project light image or-and light patterns presentation location. The twin-tower main-base (2516) may have the 1-2 feet tall to allow close people shoulder or eye level to make design paper size A4 or B2 illumination. The twin-tower base (2516) has the built-in USB-unit (2508) or-and outlet-unit (25100 and get the power from outside AC power source (not shown) and go through inner AC-to-DC circuit and other electric-parts to get AC current to LEDs for surrounding-area illumination up to A4 or B2 or more bigger size, or the said USB-unit (2508) get the DC power source from outside AC-to-DC transformer to get desired DC power. The said twin-tower main-base (2516) may has special circuitry to get not only AC but also DC power from outside circuitry-unit.

Figure 25:
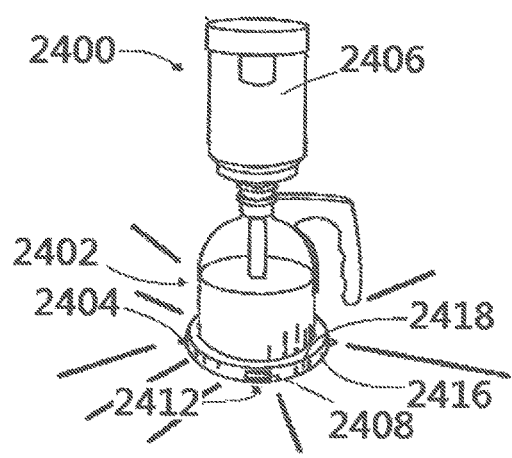

From FIG. 25 show the desk top lamp or items has liquid supplier functions or warmer for liquid items. One of embodiment is the mini. Coffee brewer equipment can fit into the pre-designed space of the said big or tall main-housing of said LED desk lamp or items. The main-base or main-housing (2400) has the built in USB-port (2412) which can charge or supply the current to other electric or digital data device.

Figure 26:
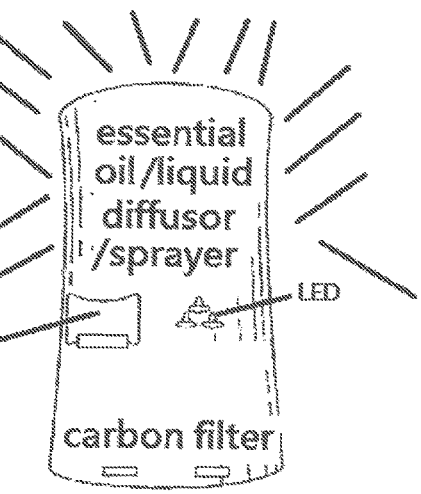
Figure 21:
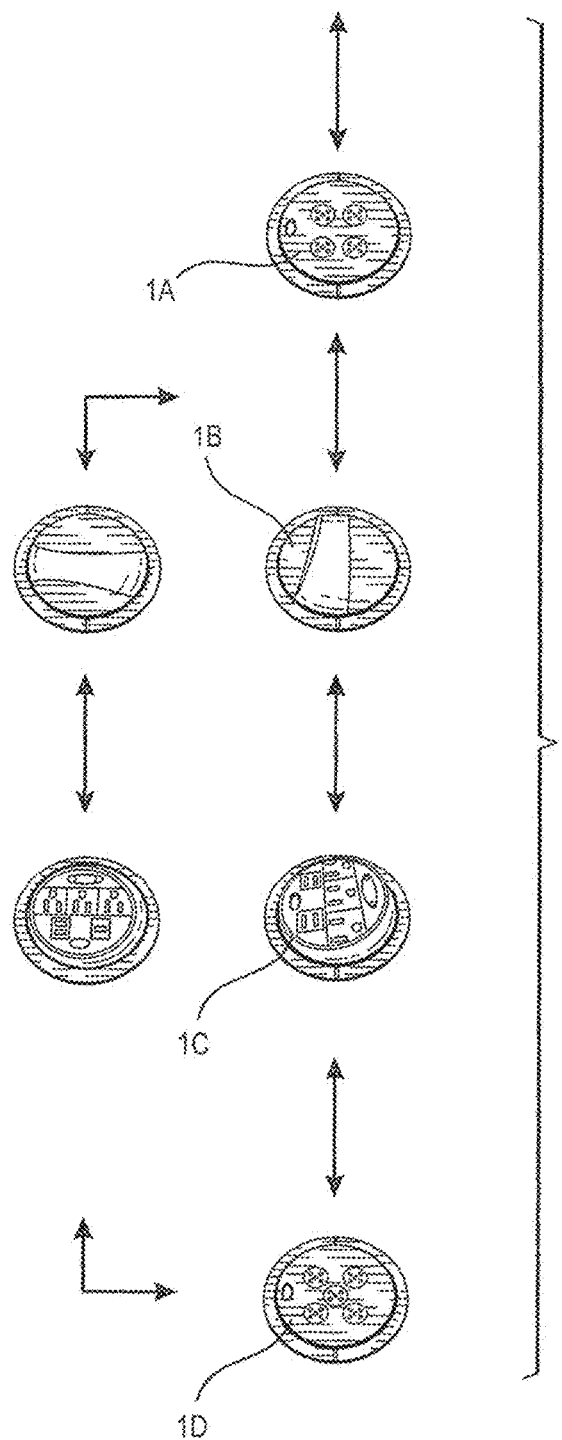
Figure 22:
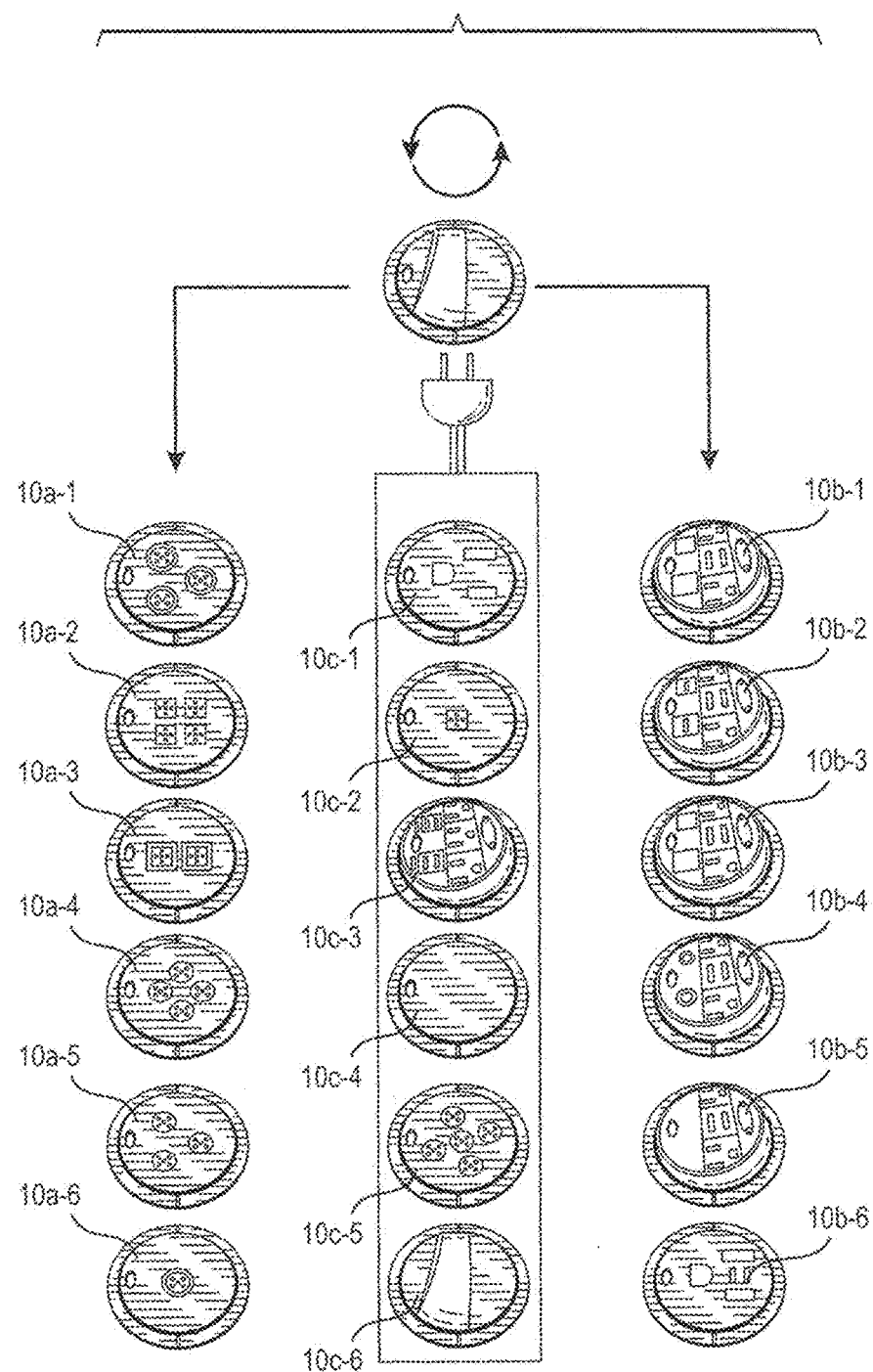

From FIG. 26 show the smell device which is one of desktop item or lamp which has proper space to install the said smell related device which including (1) air-freshener (2) fragrance dispenser or vaporizing unit (3) air-purifier (4) moisture absorber unit (5) liquid fragrance device (6) bug replier smell device and the smell can came out from openings or holes or slot as shown. The inside also has built-in plurality LEDs to make the whole or top or partial desk top item to supply desired light brightness, color, changing color, chasing light, fade-in or fade-out light while LEDs incorporate with IC and related electric parts and accessories and switch or-and sensors.

From FIG. 27 show the LED desk top item or lamp (2600) has built-in LEDs (2604) (2608) to offer the pin-hole image or lighted-pattern projection though the top shaped holes (2622) (2624) which is same as co-inventor (#GG-2008) U.S. Pat. No. 8,231,260 for Pin Holes imaging. Some of the plurality of LEDs (2618) (2604) also offer the brightness to front displayer (2626) to show time/date/week/year or-and temperature or whether status (2620).

The main-base (2602) has variety of switch, sensor, remote controller receiver (1612) to make all setting, selection of the LED color, brightness, function selection, brightness selection, sensor selection of the built-in LEDs for top pin-hole image projection or-and the body glow light brightness and colors. The said main-base (2602) also has the 2 speaker (2628) (2628') to offer the said audio or music or melody or multiple way talking functions by blue-tooth, inserting portable flasher, remote receiver system. The said the desktop item or desk top lamp which has its preferred vertical-height or-and horizon-width so can allow the body glow light brightness can cover desired areas for people reading or work. The said main-base 2602 also has built-in USB ports (2612) (2608) to connect with circuitry and power source to supply or charge other outside device or even can charge inside built-in rechargeable batteries by desired type and size and specification USB-ports selections.

From FIG. 28 show the food supplier device (2700) for desktop item or lamp. The said food supplier device (2700) can make miniature size to fit into the big-and-tall main-base of the LED desk top item or lamp to offer people can get desired food or desert or cookie or candy (2720) from the built-in food supplier device (2700). Or, the food supplier device it is an individual products put on desktop as desktop item which has main-base (2716) which has built-in USB-ports (2712) or sensor, switch (2722) and can let people get the food, candy, cookie or chocolate or other food from the food supplier device (2700). It is appreciated the food supplier device is not limited for its size or tall or width. This depend on where to put.

From FIG. 29 show the air-flow device (2800) which supply desired air-flow for hot, cold, warm, or just normal air-flow to people. The said air-flow device can make smaller with blade(s) or no blade(s) shown on outside however it offer air-flow to people under predetermined temperatures for different construction and parts. The air-flow device can install within the said LED desk top item or LED desk top lamp for big and tall main-base or main-housing so can offer people not only for LED desk top lamp with desired light illumination but also has the air-flow with preferred air for desired temperature even has moisture depend on the market requirement. The said air-flow device has the blades which can have built-in LEDs on the blade with IC control so can create desired moving and changing message, drawing, display under the people eyes persistence reaction which is same as co-inventor's US prior arts including (#JJ-) (#JJ-1) (# JJ-2). From FIG. 29 show the air-flow device (2800) which has space to install or built-in or assembled with the said USB-ports (2810) on its main-base and main-base (2806) has wire or bendable-arm (2804) to connect with male plug (2802) which can be a (AA) USB male plug, or (BB) AC male-plug, or (CC) conductive wire to connect with desktop item or lamp power source which depend on which power source want to connect with.

The desk top items, which include LED means or an LED device, are items that are used in locations where they can be easily reached, touched, operated, or managed by people, i.e., in locations or places nearby where people will stay for period of time, such as a desk, table, bed, chair, land, grass, or wherever else people like to work, rest, sit, stand, or a take nap.

As noted above, the desk top items may offer electric signals to carry out functions such as (aa) illumination as FIGS. 1,2,3,4,5,6, 23,24,25,26,27,28, or-and (bb) sound as FIG. 14,27, or-and (cc) images as FIG. 24, or-and (dd) brightness, visual effects as FIGS. 1,2,3,4,5,6, 23,24,25,26, 27,28, or-and (ee) smell as FIG. 26, or-and (ff) water, liquid, food as FIG. 25, or-and (gg) wind, moisture, airflow as FIG. 29, or-and or any conventional functions of electric devices with built-in LEDs means, such as LED lighting, a clock as FIG. 27, projector machine as FIG. 24, film, digital photo frame, time display as FIG. 27, air freshener as FIG. 26, electric perfume freshener as FIG. 26, moisturizer as FIG. 26, electric fan as FIG. 29, electric heater as FIG. 29, electric steam spreader as FIG. 29, electric cooler as FIG. 29, electric air conditioner as FIG. 29, or other conventionally available items that can be placed to or add-on the said LED desk lamp to let people easily reach, touch, operate, or manage the items.

The desk top items may be powered by a direct current (DC) power source such as FIGS. 1,2,3,4,5,6,10,12 from outside transformer, or alternating current (AC) power source having appropriate AC-plug wire or electric parts and accessories or components, such as circuit, IC, sensor, a motion sensor, timer, time delay, timer, resilient kits, conductive kits, transformer, inverter, adaptor, wire, prongs, UL listed adapter, PIR remote controller, infrared controller, wireless controller, Bluetooth controller, Internet controller, Wifi controller, master power controller, and/or AC power outlet-unit(s) to offer electric power at a voltage (Volt) and amperage (Amp or ma) sufficient to achieve a desired charging time. The USB-unit(s) only serve as a power source for charging energy-storage unit or assembly including rechargeable batteries inside the other electric or digital device(s) and do not have an electric data transfer function. If a plurality of USB-units are provided, the USB-units can be arranged to have different output power to charge different electric or digital data device(s). If additional outlet-units are provided the outlet-units may be AC outlet-unit(s) that serve as an AC power source with optional surge protection features.

Electric or digital data device(s) that may be charged by the USB-unit(s) by its USB Charging-ports for quickly charger capacity minimum has 1.0 Amp capacity include an MP3 or MP4 player, smart phone, computer, iPhone™, iPad™, video game, digital visual equipment, communication equipment, and other consumer electric products including the rechargeable batteries application such as Power bank for storage power tank.

The USB-unit or USB-module of the preferred desk top items may be turned on or turned off for a predetermined time by switch, sensor, timer, photo sensor, motion sensor, time delay, and/or master control power controller, infra-red wireless, remote controller, wireless controller, APP software, Wifi or internet or network wireless controller, Z-wave remote controller.

All receiving port(s) in the desk top items, including USB-units or USB modules, may have a removable cover to allow kids or others to safely touch the items and prevent dust, or water from getting into the receiving means.

The USB-unit or USB-module to charge other electric or digital device(s) can be removable from the desk top items and carried with people to use when people leave the desk top items. For this purpose, the USB-unit(s) or USB-module(s) can be disassembled from the desk top items and re-assembled into the said desk top items by quick connector means, adaptor means, assembly means, or fixing means, with each of the USB-unit(s) or USB-module(s) having its own safety certification(s) so that the individual USB-unit(s) or USB-module(s) can be tested by safety authorities and sold separately.

The USB-unit(s) includes USB charging-ports which is an electric charging unit which has a USB-female receiving end to receive a USB-male plug from the USB-wire which has 2 male plugs on 2 ends to deliver electric power from the USB-female receiving means (USB Charging-ports) to the other device's/USB-wire's USB-male plug. The preferred USB charging-ports (USB-female receiving means) gets power from a power source and uses its circuit to convert or transform the electric power to a desired waveform, voltage, and current sufficient to charge Energy-Storage unit or assembly inside of the other electric or digital device(s) through the USB male plug insert into desktop items USB-female receiving port.

The items of these embodiments may be in the form of lighting, an desk lamp, table lighting, lava light, projection light, time piece, electric fan, air freshener, indicator coffee machine, indicator sound device, and visual device has LED(s).

I claim:

1. An LED desktop item having at least one built-in USB port to charge an energy storage unit of another electric or digital data device, comprising:
   a plurality of LEDs installed in the desktop item and arranged in an array, matrix, or lines, or on a printed circuit board, or in a detachable LED bulb, to provide area illumination;
   a power cord with an AC plug for supplying AC power to a built-in AC-to-DC circuit of the LED desktop item, or for supplying DC power to the LED desktop item through an external transformer; and
   at least one built-in DC-to-DC circuit for changing a first DC current supplied by the AC-to-DC circuit or the external transformer into at least one second DC current, the first or second DC current including (1) a USB current for a USB charging output by the built-in USB port, (2) a DC current for supply to the LEDs, and (3) a DC current for powering at least one additional function of the LED desk top item,
   wherein:
   the at least one additional function is selected from:
   (i) playing music,
   (ii) receiving and delivering audio signals,
   (iii) providing, at a predetermined temperature, air flow, moisture, steam, odor, or liquid,
   (iv) providing an additional night or accent light,
   (v) utilizing at least one additional LED as an indicator or charging status light,
   (vi) illuminating a cosmetic mirror, and
   (vii) supplying power to additional female plug receiving ports, and
      the desktop item is installed near a location where persons stay for a period of time, the location including a desk, table, bed, chair, or lawn,
      said USB charging output has a current of between 1.0A and at least 5A to provide a charging function for said another electric or digital data device, a DC current input of said USB port being connected exclusively to the external transformer, the AC-to-DC circuit, or the DC-to-DC circuit and not to a battery, and
      wherein the at least USB port has a charging function only and lacks a data transfer function.

2. An LED desktop item having at least one built-in USB port to charge an energy storage unit of another electric or digital data device as recited in claim 1, wherein the at least one USB charging port includes a plurality of USB charging ports having different output power to charge many different electric or digital data devices.

3. An LED desktop item having at least one built-in USB port to charge an energy storage unit of another electric or digital data device as recited in claim 1, wherein the LED desktop item has at least one built-in AC outlet-port to supply AC current through a conductive piece or assembly without any additional circuitry or electric controller.

4. An LED desktop item having at least one built-in USB port to charge an energy storage unit of another electric or digital data device as recited in claim 1, wherein the LED desktop item has space to accommodate a large number of USB ports, AC outlet ports or both USB ports and AC outlet ports to supply power simultaneously to a plurality of users in a public area.

5. An LED desktop item having at least one built-in USB port to charge an energy storage unit of another electric or digital data device as recited in claim 1, wherein the USB port is arranged to receive a plurality of different types of USB plug.

6. An LED desktop item having at least one built-in USB port to charge an energy storage unit of another electric or digital data device as recited in claim 1, wherein the USB port is included in a rotating unit which has more than one surface, each surface having a different function.

7. An LED desktop item having at least one built-in USB port to charge an energy storage unit of another electric or digital data device as recited in claim 1, wherein the said LED desktop item is an LED reading or accent lamp.

8. An LED desktop item having at least one built-in USB port to charge an energy storage unit of another electric or digital data device as recited in claim 1, wherein the another electric or digital data device has a built-in energy-storage unit or assembly including rechargeable batteries, and is one of an MP3 or MP4 player, a smartphone, a computer, an iPhone™, an iPad™, a video game, digital visual equipment, communication equipment, a consumer electric product, and a power bank.

9. An LED desktop item having at least one built-in USB port to charge an energy storage unit of another electric or digital data device as recited in claim 1, wherein the at least one USB charging port is supplied with power from said AC-to-DC circuit that converts said AC power into a USB charging output, the AC-to-DC circuit including a transformer or invertor or adaptor.

10. An LED desktop item having at least one built-in USB port to charge an energy storage unit of another electric or digital data device as recited in claim 1, wherein the USB port or another function of the LED desktop item is turned on or turned off by a switch, sensor, timer, photosensor, motion sensor, time delay, master control power kit, remote controller, infrared controller, or wireless controller.

11. An LED desktop item having at least one built-in USB port to charge an energy storage unit of another electric or digital data device as recited in claim 1, wherein the USB port has a removable or movable cover to prevent kids, dust, or water from getting into the USB port.

12. An LED desktop item having at least one built-in USB port to charge an energy storage unit of another electric or digital data device as recited in claim 1, wherein the USB port is included in a UL listed or test-lab approved USB-unit or USB-module having built-in prongs and which is adapted to be detached from a housing of the desktop item and carried away by a user.

13. An LED desktop item having at least one built-in USB port to charge an energy storage unit of another electric or digital data device as recited in claim 12, wherein the USB-unit or USB-module is adapted to be reassembled to the desktop item's housing by a connector or adaptor.

14. An LED desktop item having at least one built-in USB port to charge an energy storage unit of another electric or digital data device as recited in claim 12, wherein the USB-unit or USB-module has its own safety certification and as a result is adapted to be sold and used separately from the desktop item without additional safety testing.

15. An LED desktop item having at least one built-in USB port to charge an energy storage unit of another electric or digital data device as recited in claim 12, wherein the USB-unit is an electric charging unit having USB female receiving ends to receive a USB wire's male-plug.

16. An LED desktop item having at least one built-in USB port to charge an energy storage unit of another electric or digital data device as recited in claim 1, wherein the LED desktop item has at least one USB-female receiving-end and at least one additional female receiving end selected from an outlet-port, USB-receiving port, and adaptor-port for receiving Type A, Type B, and Type C USB plugs.

17. An LED desktop item having at least one built-in USB port to charge an energy storage unit of another electric or digital data device as recited in claim 1, wherein the USB port supplies DC current form to charge a rechargeable energy storage unit or assembly inside said another electric or digital device.

* * * * *